United States Patent
Winarski et al.

(10) Patent No.: US 8,245,113 B2
(45) Date of Patent: *Aug. 14, 2012

(54) CONVOLUTION-ENCODED RAID WITH TRELLIS-DECODE-REBUILD

(75) Inventors: Daniel James Winarski, Tucson, AZ (US); Craig A. Klein, Tucson, AZ (US); Nils Haustein, Soergenloch (DE)

(73) Assignee: International Business Machines Corporation, Armonk, NY (US)

( * ) Notice: Subject to any disclaimer, the term of this patent is extended or adjusted under 35 U.S.C. 154(b) by 973 days.

This patent is subject to a terminal disclaimer.

(21) Appl. No.: 12/115,455

(22) Filed: May 5, 2008

(65) Prior Publication Data

US 2008/0209304 A1    Aug. 28, 2008

Related U.S. Application Data

(63) Continuation of application No. 11/125,288, filed on May 9, 2005, now Pat. No. 7,370,261.

(51) Int. Cl.
*G11C 29/00* (2006.01)
(52) U.S. Cl. .......................................................... 714/770
(58) Field of Classification Search .............. 714/6, 746, 714/763, 770, 792
See application file for complete search history.

(56) References Cited

U.S. PATENT DOCUMENTS

| | | | |
|---|---|---|---|
| 4,761,785 A | 8/1988 | Clark et al. | |
| 5,315,602 A | 5/1994 | Noya et al. | |
| 5,596,709 A | 1/1997 | Bond et al. | |
| 5,987,562 A * | 11/1999 | Glover | 711/4 |
| 6,219,800 B1 | 4/2001 | Johnson et al. | |
| 6,516,443 B1 | 2/2003 | Zook | |

FOREIGN PATENT DOCUMENTS

| | | |
|---|---|---|
| JP | 09251725 | 9/1997 |
| JP | 2003015931 | 1/2003 |
| JP | 2003030013 | 1/2003 |
| JP | 2003296176 | 10/2003 |
| JP | 2007140829 | 6/2007 |

OTHER PUBLICATIONS

General Information on RAID, Intelligent Computer Peripherals ICP (http://www.icp-vortex.com/english/support/level_e.htm), Jun. 7, 2007.
"RAID Level 6" (http://www.pcguide.com/ref/hdd/perf/raid/levels/singleLevel6c.html), Apr. 17 2001.
Kagel, "RAID5 Versus RAID10 (or Even RAID3 or RAID4)", 2005.
"Storing Data on Disk" (http://www.cse.iitk.ac.in/~hk/sc315/slides/StoringDataOnDisk.pdf), 2004.

(Continued)

*Primary Examiner* — Shelly A Chase
(74) *Attorney, Agent, or Firm* — Dale F. Regelman; Quarles & Brady LLP

(57) ABSTRACT

A Redundant Array of Independent Devices uses convolution encoding to provide redundancy of the striped data written to the devices. No parity is utilized in the convolution encoding process. Trellis decoding is used for both reading the data from the RAID and for rebuilding missing encoded data from one or more failed devices, based on a minimal, and preferably zero, Hamming distance for selecting the connected path through the trellis diagram.

20 Claims, 15 Drawing Sheets

OTHER PUBLICATIONS

Gray et al., "Parity Striping of Disc Arrays: Low-Cost Reliable Storage with Acceptable Throughput," 16th Int'l. Conf. on Very Large Data Bases, pp. 148-161, 1990.

Hsieh et al., "An XOR based Reed-Solomon algorithm for advanced RAID systems," 2004, Proceedings of the 19th IEEE International Symposium on defect and fault tolerance in VLSI systems, p. 1 to 8.

Tau et al., "Efficient parity placement for tolerating triple disk failures in RAID architectures," 2003, Proceedings of the 17th IEEE International Conference on Advanced information networking and applications, p. 1 to 6.

Tazaki et al., "A Consideration on the Application of Trellis Coded Modulation to the Magnetic Recording," 1995, Proceedings of the ITE Annual Convention, The Institute of Television Engineers, pp. 29-30.

Tazaki et al., "A Consideration on Coordinated Property of Recording Code and Signal Processing Method," 1996, IEICE Technical Report, The Institute of Electronics, Information and Communication Engineers, pp. 21-28.

* cited by examiner

READ (10) COMMAND 605

| | BIT 7 | BIT 6 | BIT 5 | BIT 4 | BIT 3 | BIT 2 | BIT 1 | BIT 0 |
|---|---|---|---|---|---|---|---|---|
| BYTE 0 | OPERATION CODE (28h) ||||||||
| BYTE 1 | LOGICAL UNIT NUMBER 609 ||| DPO | FUA | RESERVED | RelAdr |
| BYTE 2 | (MSB)    607 — LOGICAL BLOCK ADDRESS ||||||||
| BYTE 3 | ||||||||
| BYTE 4 | ||||||||
| BYTE 5 | (LSB) ||||||||
| BYTE 6 | RESERVED ||||||||
| BYTE 7 | (MSB)    608 — TRANSFER LENGTH ||||||||
| BYTE 8 | (LSB) ||||||||
| BYTE 9 | CONTROL BYTE ||||||||

*FIG. 2*

ENCODER STATE DIAGRAM FOR (2, 1, 3) CODE

290

| INITIAL STATE | DESTINATION STATE | INPUT INFORMATION | CODED DATA |
|---|---|---|---|
| $S_0$ | $S_0$ | 0 | 00 |
| $S_0$ | $S_1$ | 1 | 11 |
| $S_1$ | $S_2$ | 0 | 01 |
| $S_1$ | $S_3$ | 1 | 10 |
| $S_2$ | $S_4$ | 0 | 11 |
| $S_2$ | $S_5$ | 1 | 00 |
| $S_3$ | $S_6$ | 0 | 10 |
| $S_3$ | $S_7$ | 1 | 01 |
| $S_4$ | $S_0$ | 0 | 11 |
| $S_4$ | $S_1$ | 1 | 00 |
| $S_5$ | $S_2$ | 0 | 10 |
| $S_5$ | $S_3$ | 1 | 01 |
| $S_6$ | $S_4$ | 0 | 00 |
| $S_6$ | $S_5$ | 1 | 11 |
| $S_7$ | $S_6$ | 0 | 01 |
| $S_7$ | $S_7$ | 1 | 10 |

*FIG. 13*

A (2, 1, 3) BINARY CONVOLUTION ENCODER
2 OUTPUTS, 1 INPUT, AND 3 STAGES OF DELAYS

| | BIT 7 | BIT 6 | BIT 5 | BIT 4 | BIT 3 | BIT 2 | BIT 1 | BIT 0 |
|---|---|---|---|---|---|---|---|---|
| BYTE 0 | OPERATION CODE (2Ah) | | | | | | | |
| BYTE 1 | LOGICAL UNIT NUMBER —604 | | | DPO | FUA | RESERVED | | RelAdr |
| BYTE 2 | (MSB) 602—LOGICAL BLOCK ADDRESS | | | | | | | |
| BYTE 3 | | | | | | | | |
| BYTE 4 | | | | | | | | |
| BYTE 5 | | | | | | | | (LSB) |
| BYTE 6 | RESERVED | | | | | | | |
| BYTE 7 | (MSB) 603—TRANSFER LENGTH | | | | | | | |
| BYTE 8 | | | | | | | | (LSB) |
| BYTE 9 | CONTROL BYTE | | | | | | | |

600 — WRITE (10) COMMAND

*FIG. 15*

CONVOLUTION-ENCODED RAID WITH TRELLIS-DECODE-REBUILD

CROSS-REFERENCE TO RELATED APPLICATION

This application is a Continuation Application claiming priority from the application having Ser. No. 11/125,288, filed date May 9, 2005, now U.S. Pat. No. 7,370,261.

TECHNICAL FIELD

The disclosure herein relates to data storage.

SUMMARY OF THE INVENTION

A method, system and computer program product for storing convolution-encoded data on a redundant array of independent storage devices (RAID) are described. In system form, embodiments comprise a plurality of storage devices and a trellis decoder coupled to the storage devices. The decoder is adapted to process coded data received from the storage devices to produce decoded data. The coded data comprises error correction coded data produced by the convolution of present and past bits of information. The system is adapted to determine if there is a failed storage device and in response to determining that there is a failed storage device the system allocates storage space for the storage of reconstructed data. The reconstructed data comprises coded data previously stored on the failed storage device. The system processes the decoded data to produce the reconstructed data and stores the reconstructed data on the allocated storage space.

In certain embodiments, the system is further adapted to measure a quantity of errors in the decoded data, compare the quantity of errors to an error limit for each of the plurality of storage devices and in response to the quantity of errors exceeding the error limit for a storage device, identifying the storage device as the failed storage device. In certain embodiments, the system is further adapted to receive self monitoring analysis and reporting technology information from the plurality of storage devices and in response to the self monitoring analysis and reporting technology information indicating a failure for a storage device, identifying the storage device as the failed storage device. In certain embodiments, the coded data comprises one or more words, each the word comprising n bits, where n is greater than zero, each the word produced from a convolution encoder processing a portion of information and none of the plurality of storage devices has two or more consecutive words or more than one of the n bits of each the word. In certain embodiments, the system further comprises a metadata controller adapted to process metadata associated with the coded data, the metadata comprising storage location information specifying a storage location for the coded data and/or specifying the type of encoding for the coded data.

BRIEF DESCRIPTION OF THE DRAWINGS

FIG. 2 illustrates an exemplary read command.

FIG. 13 illustrates the encoder state diagram for a (2,1,3) error correction code of FIG. 12 in table form.

FIG. 15 illustrates an exemplary SCSI write command used to write reconstructed encoded data to spare storage.

DETAILED DESCRIPTION OF THE PREFERRED EMBODIMENTS

Figure 1:
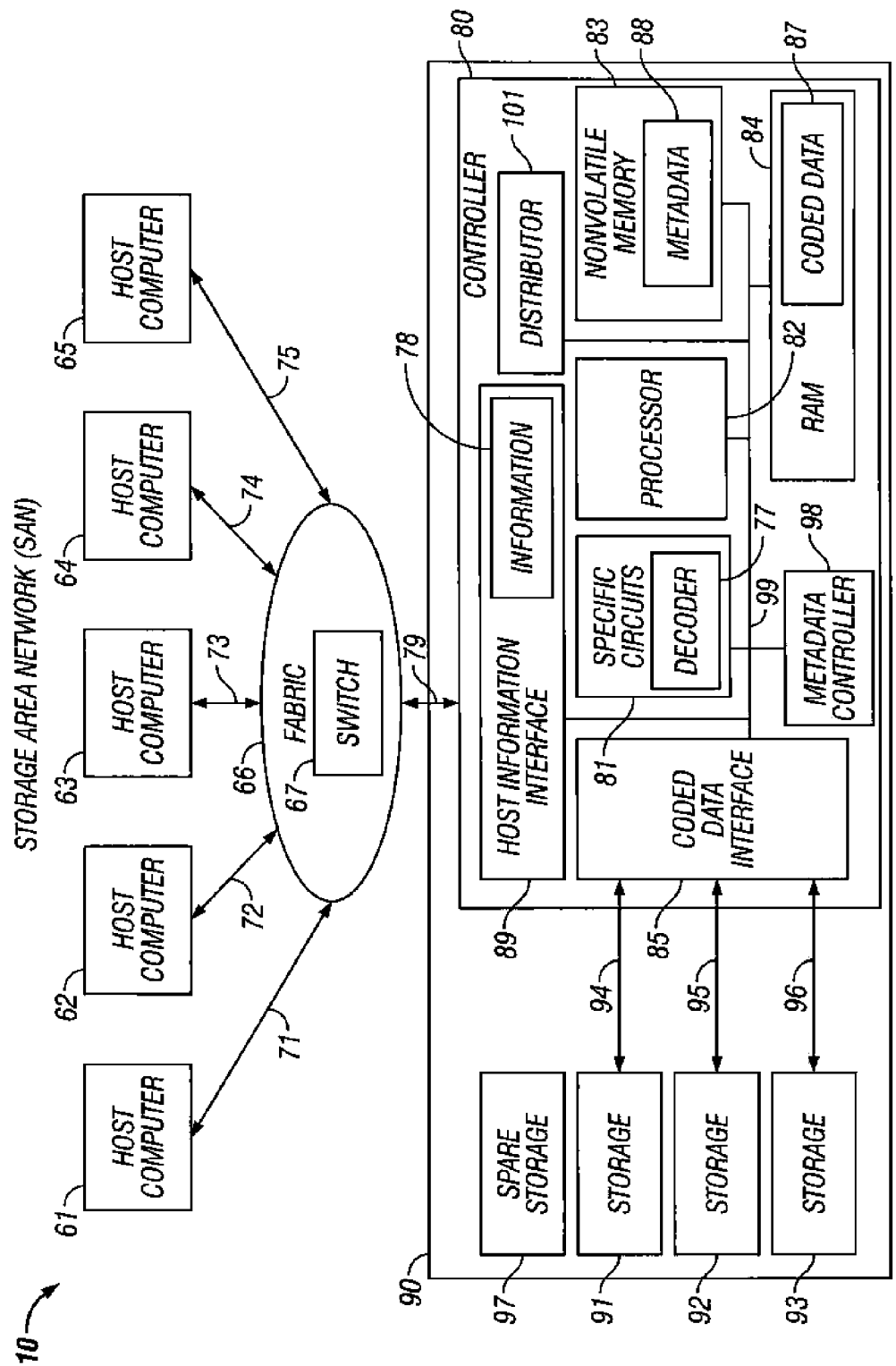
FIG. 1 is a block diagram illustrating aspects of an exemplary storage area network ("SAN").

Referring to figures, wherein like parts are designated with the same reference numerals and symbols, FIG. 1 is a block diagram that illustrates aspects of an exemplary storage area network (SAN) 10. SAN 10 is typically designed to operate as a switched-access-network, wherein switches 67 are used to create a switching fabric 66. In certain embodiments SAN 10 is implemented using the Small Computer Systems. Interface (SCSI) protocol running over a Fibre Channel ("FC") physical layer. In other embodiments, SAN 10 may be implemented utilizing other protocols, such as Infiniband, FICON (a specialized form of Fibre Channel CONnectivity), TCP/IP, Ethernet, Gigabit Ethernet, or iSCSI. The switches 67 have the addresses of both the hosts 61, 62, 63, 64, 65 and controller 80 so that any of hosts 61-65 can be interchangeably connected to any controller 80.

Host computers 61, 62, 63, 64, 65 are coupled to fabric 66 utilizing I/O interfaces 71, 72, 73, 74, 75 respectively. I/O interfaces 71-75 may be any type of I/O interface; for example, a FC loop, a direct attachment to fabric 66 or one or more signal lines used by host computers 61-65 to transfer information respectfully to and from fabric 66. Fabric 66 includes, for example, one or more FC switches 67 used to connect two or more computer networks. In certain embodiments, FC switch 67 is a conventional router switch.

Switch 67 interconnects host computers 61-65 to controller 80 across I/O interface 79. I/O interface 79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectively to and from controller 80 and subsequently to a plurality of storage devices 91-93. In the example shown in FIG. 1, storage devices 91-93 and controller 80 are operated within RAID 90. RAID 90 may also include spare storage 97 that may be exchanged with storage devices 91-93 in case of the failure of any of storage devices 91-93. Additional storage in excess of storage devices 91-93 could be included in RAID 90. Alternately, storage 91-93 could be physically remote from each other as well as controller 80, so that a single disaster could jeopardize only one of storage devices 91-93.

RAID 90 typically comprises one or more controllers 80 to direct the operation of the RAID. Controller 80 may take many different forms and may include an embedded system, a distributed control system, a personal computer, workstation, etc. FIG. 1 shows a typical RAID controller 80 with processor 82, metadata controller 98, random access memory (RAM) 84, nonvolatile memory 83, specific circuits 81, coded data interface 85 and host information interface 89. Processor 82, RAM 84, nonvolatile memory 83, specific circuits 81, metadata controller 98, coded data interface 85 and host information interface 89 communicate with each other across bus 99.

Figure 14:
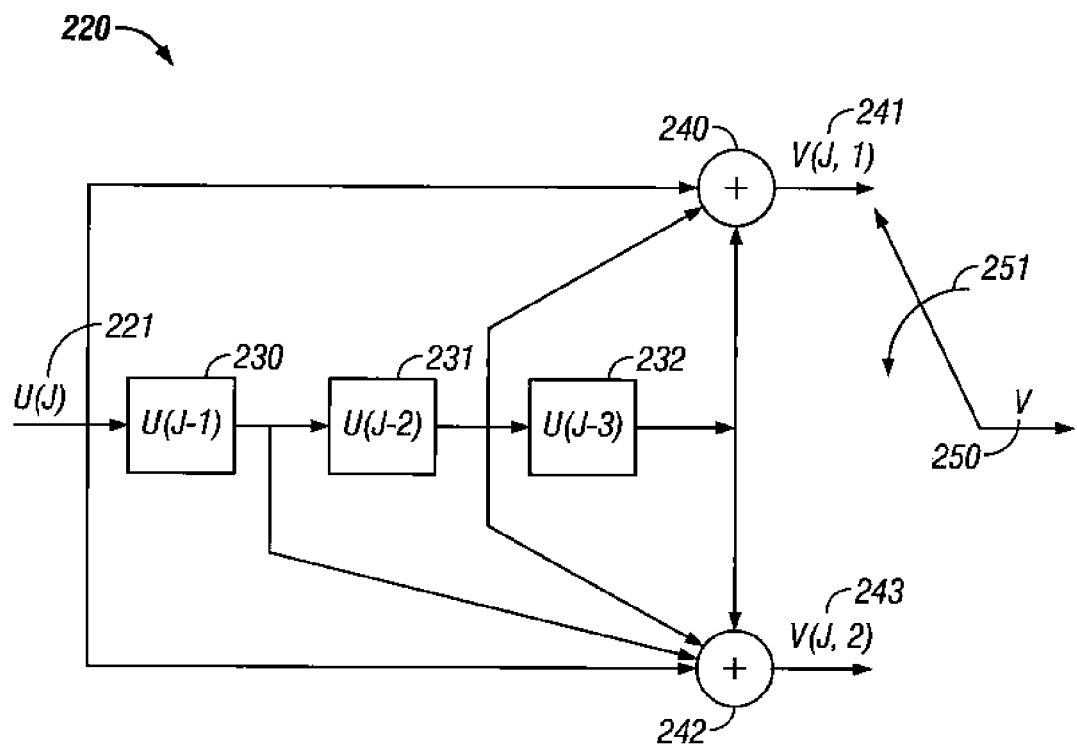
FIG. 14 illustrates a (2,1,3) binary convolution encoder circuit with two outputs, one input, and three stages of delay elements.

Alternatively, RAM 84 and/or nonvolatile memory 83 may reside in processor 82 along with specific circuits 81, coded data interface 85, metadata controller 98, and host information interface 89. Processor 82 may include an off-the-shelf microprocessor, custom processor, FPGA, ASIC, or other form of discrete logic. RAM 84 is typically used as a cache for data written by hosts 61-65 or read for hosts 61-65, to hold calculated data, stack data, executable instructions, etc. In addition, RAM 84 is typically used for the temporary storage of coded data 87 from an encoder (i.e. encoder 86) before that data is stored on storage devices 91-93. An example of an encoder is convolution encoder 220 (FIG. 14). In certain embodiments convolution encoder 220 may reside in specific circuits 81. RAM 84 is typically used for the temporary storage of coded data 87 after that data is read from storage devices 91-93, before that data is decoded by decoder 77. Examples of decoder 77 are trellis decoder 300 in FIG. 7 and trellis decoder 500 in FIG. 11.

In certain embodiments, distributor 101 is implemented in processor 82 by software, firmware, dedicated logic or combinations thereof. In addition, all or part of distributor 101 may reside outside controller 80, such as in a software implementation in one of hosts 61-65. Distributor 101 distributes coded data (i.e. coded data 87) to RAM 84, and/or directly to storage devices in a format such that the coded data and/or the source information may be decoded and/or reconstructed from non-failing storage devices in the case where one or more storage devices have failed. During a write process, when distributor 101 distributes the data to the storage devices, such as devices 91-93, the distribution is done in accordance with metadata 88, so that the distributed data can be later read from the storage devices. During a read process, distributor 101 retrieves the data from the storage devices, such as devices 91-93, and reassembles coded data 87 to RAM 84, based on the same metadata 88.

Figure 3:
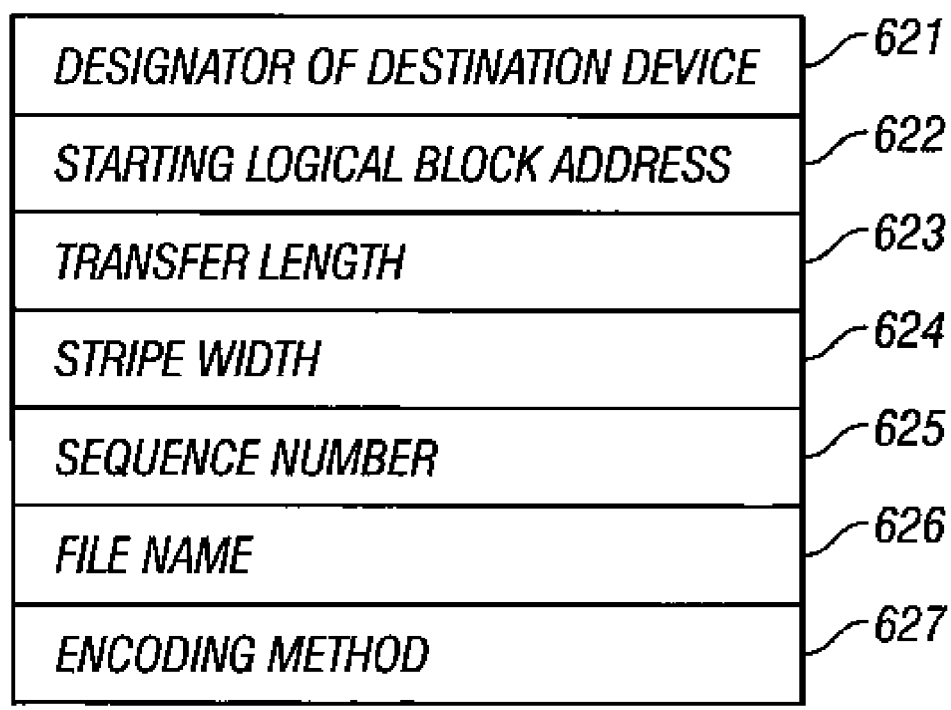
FIG. 3 illustrates a metadata structure.

Nonvolatile memory 83 may comprise any type of nonvolatile memory such as Electrically Erasable Programmable Read Only Memory (EEPROM), flash Programmable Read Only Memory (PROM), battery backup RAM, hard disk drive, or other similar device. Nonvolatile memory 83 is typically used to hold the executable firmware and any nonvolatile data, such as metadata 88. Details of metadata 88 are further discussed below with reference to FIG. 3.

In certain embodiments, coded data interface 85 comprises one or more communication interfaces that allow processor 82 to communicate with storage devices 91-93. Host information interface 89 allows processor 82 to communicate with fabric 66, switch 67 and hosts 61-65. Examples of coded data interface 85 and host information interface 89 include serial interfaces such as RS-232, USB (Universal Serial Bus), SCSI (Small Computer Systems Interface), Fibre Channel, Gigabit Ethernet, etc. In addition, coded data interface 85 and/or host information interface 89 may comprise a wireless interface such as radio frequency ("RF") (i.e. Bluetooth) or an optical communications device such as Infrared (IR).

In certain embodiments, metadata controller 98 is implemented in processor 82 by software, firmware, dedicated logic or combinations thereof. In addition, all or part of metadata controller 98 may reside outside controller 80, such as in a software implementation in one of hosts 61-65 or another processing device. Metadata controller 98, manages metadata associated with information received for storage as coded data on storage devices. In certain embodiments, metadata controller 98 is responsible for generating, changing, maintaining, storing, retrieving and processing metadata (i.e. metadata 88) associated with information received for storage as coded data.

Specific circuits 81 provide additional hardware to enable controller 80 to perform unique functions, such as fan control for the environmental cooling of storage devices 91-93, controller 80, and decoder 77. Decoder 77 may be implemented as a Trellis decoder. Specific circuits 81 may comprise electronics that provide Pulse Width Modulation (PWM) control, Analog to Digital Conversion (ADC), Digital to Analog Conversion (DAC), exclusive OR (XOR), etc. In addition, all or part of specific circuits 81 may reside outside controller 80, such as in a software implementation in one of hosts 61-65.

Figure 7:
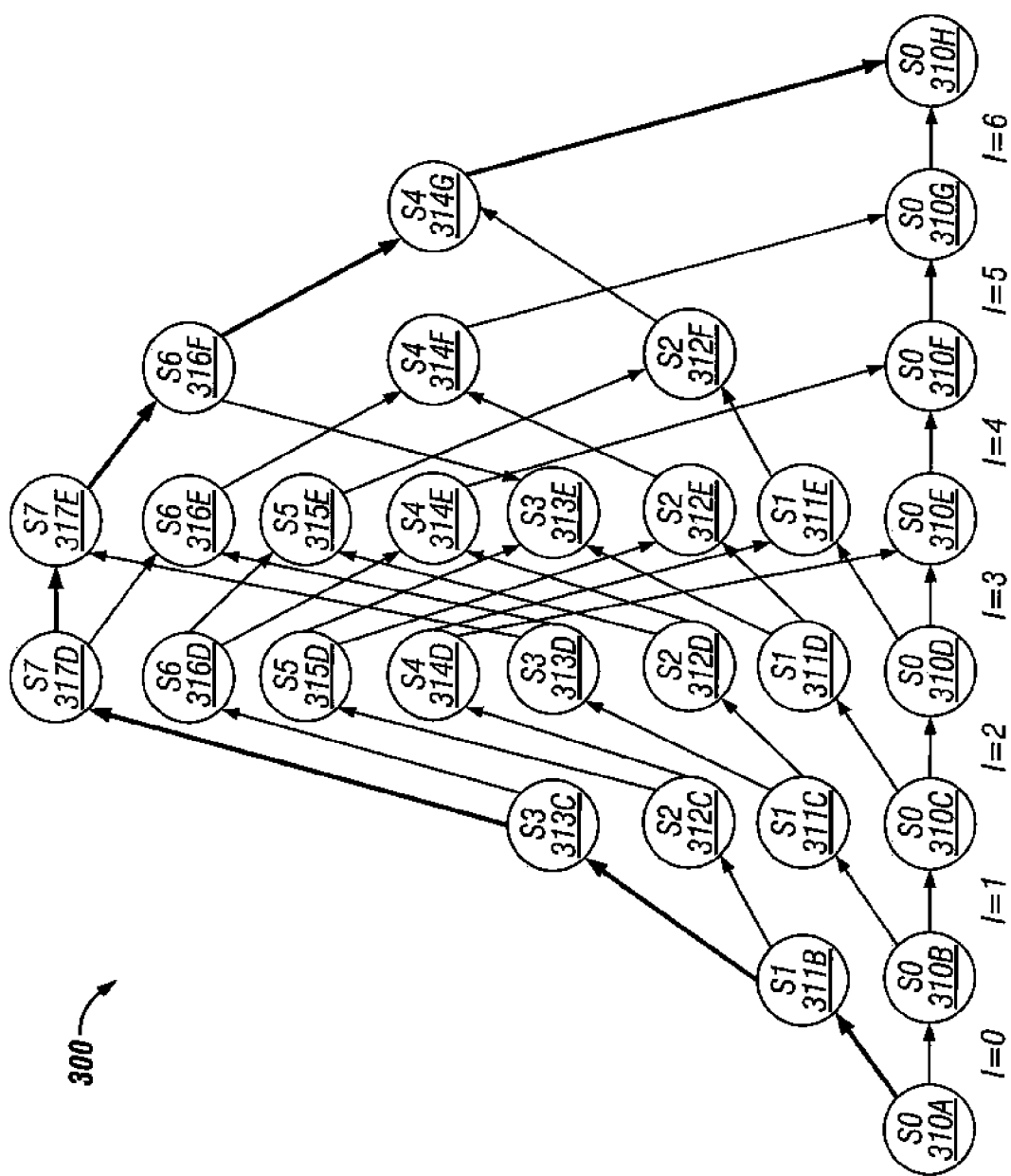
FIG. 7 illustrates a trellis decoder for (2,1,3) code.

Decoder 77 may be implemented as a trellis decoder to decode coded data read from RAID storage devices (i.e. storage devices 91-93). The operation of a trellis decoder may be explained by use of trellis diagram 300 (FIG. 7). States $S_0$-$S_7$ are shown in FIG. 7 and it is assumed that the initial contents of all memory registers, of the convolution encoder used to encode the information into the coded data stored on the storage devices are initialized to zero. For example, memory registers 230-232 of convolution encoder 220 (FIG. 14) are initialized to zero. This has the result that the trellis diagram used to decode the coded data 87 read from the storage devices to produce the original host information 78 always begins at state $S_0$ and concludes at state $S_0$.

Trellis diagram 300 (FIG. 7) begins at state $S_0$ 310A. From $S_0$ 310A, trellis diagram 300 transitions to either $S_0$ 310B or $S_1$ 311B. The increase from suffix A to suffix B in the numbering of the states in trellis diagram 300 is called a branch, and the branch index I is zero when transitioning from suffix A to suffix B. From $S_0$ 310B, trellis diagram 300 transitions to either $S_0$ 310C or $S_1$ 311C; and from $S_1$ 311B, transitions to either $S_2$ 312C or $S_3$ 313C, and the branch index I is 1. From $S_0$ 310C, trellis diagram 300 transitions to either $S_0$ 310D or $S_1$ 311D; from $S_1$ 311C transitions to either $S_2$ 312D or $S_3$ 313D; from $S_2$ 312C transitions to either $S_4$ 314D or $S_5$ 315D; or from $S_3$ 313C transitions to either $S_6$ 316D or $S_7$ 317D, and the branch index I is 3.

The next series of transitions in trellis diagram 300 show the full breath of the decoding effort. From $S_0$ 310D, trellis diagram 300 transitions to either $S_0$ 310E or $S_1$ 311E; from $S_1$ 311D transitions to either $S_2$ 312E or $S_3$ 313E; from $S_2$ 312D transitions to either $S_4$ 314E or $S_5$ 315E; or from $S_3$ 313D transitions to either $S_6$ 316E or $S_7$ 317E, and the branch index I is 4. Also, From $S_7$ 317D, trellis diagram 300 transitions to either $S_7$ 317E or $S_6$ 316E; from $S_6$ 316D transitions to either $S_5$ 315E or $S_4$ 314E; from Ss 315D transitions to either $S_3$ 313E or $S_2$ 312E; or from $S_4$ 314D transitions to either $S_1$ 311E or $S_0$ 310E.

Typically, what is shown for branch index I=4 is repeated a plurality of times in a trellis diagram. However, brevity permits only one such iteration in FIG. 7. For the rest of FIG. 7, the trellis diagram is shown to conclude, indicating the ending of the decoding process. From $S_0$ 310E, trellis diagram 300 transitions only to $S_0$ 310F; from $S_1$ 311E transitions only to $S_2$ 312F; from $S_2$ 312E transitions only to $S_4$ 314F; and from $S_3$ 313E transitions only to $S_6$ 316F, and the branch index I is 5. Also, from $S_7$ 317E, trellis diagram 300 transitions only to $S_6$ 316F; from $S_6$ 316E transitions only to $S_4$ 314F; from $S_5$ 315E transitions only to $S_2$ 312F; and from $S_4$ 314E transitions only to $S_0$ 315E. From $S_0$ 310F, trellis diagram 300 transitions only to $S_0$ 310G; and from $S_2$ 312F transitions only to $S_4$ 314G; and the branch index I is 6. Also, from $S_6$ 316F, trellis diagram 300 transitions only to $S_4$ 314G; and from $S_4$ 314F transitions only to $S_0$ 310G. Finally, from $S_0$ 310G trellis diagram 300 transitions only to $S_0$ 310H; and the branch index I is 7. Also, from $S_4$ 314G, trellis diagram 300 transitions only to $S_0$ 310H.

In FIG. 7, example highlighted decoding path $S_0$ 310A, S 311B, $S_3$ 313C, $S_7$ 317D, $S_7$ 317E, $S_6$ 316F, $S_4$ 314G, and $S_0$ 310H takes the encoded data 11100110010011 and decodes it into 1111000, per table 290, FIG. 13.

Figure 6:
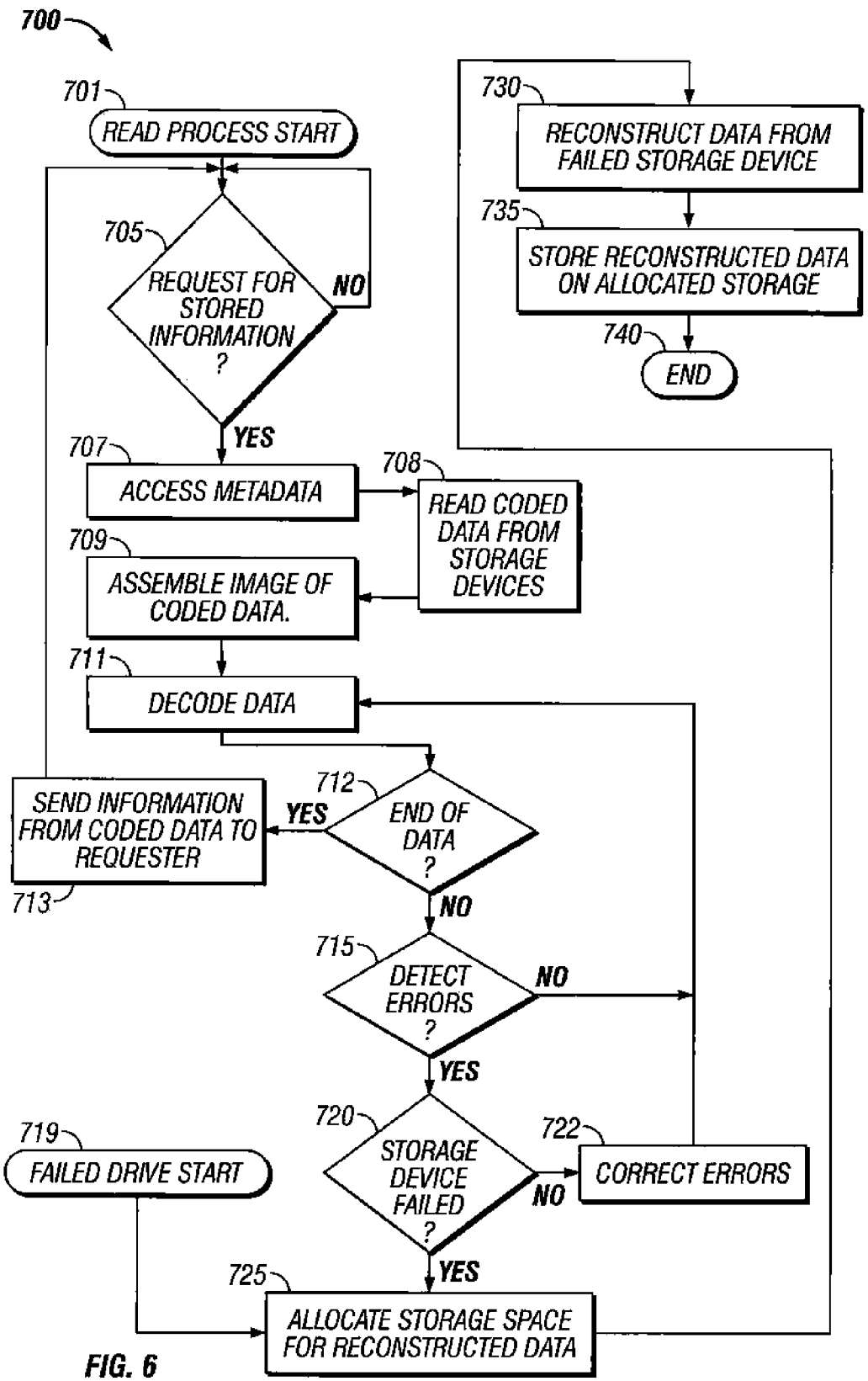
FIG. 6 illustrates a flowchart for the reading of encoded data from a convolution-encoded RAID.

Flowchart 700, shown in FIG. 6 outlines a process to implement one embodiment to decode error correction coded data obtained from RAID storage devices. The process begins at step 701 and flows to decision step 705, to determine if controller 80 received a request for stored information from a source (i.e. host computers) 61-65). The information requested from controller 80 may have been previously stored on the storage devices by a customer, a third party providing a service to a customer, a user or any other entity that has access to controller 80. If a request for stored information is not received, the process cycles back to step 705. In certain embodiments, host information interface 89 receives the request for stored information and transfers the request to other components coupled to controller 80 (i.e. processor 82, specific circuits 81, etc.). If a request for stored information is received, the process flows to step 707, where controller 80 first obtains the metadata 88 (FIG. 3) associated with the desired stored information, based on the desired file name 626 (or other identifier) requested by one of hosts 61-65, to determine upon what storage device(s) (i.e. by use of designator 621, FIG. 3) the coded data has been placed, the starting LBA 622 of the coded data, the transfer length 623 to obtain the coded data, stripe width 624, and the sequence number 625. Metadata 88 could be obtained from nonvolatile memory 83.

In certain embodiments a metadata controller (i.e. metadata controller 98) locates and processes metadata 88 associated with the coded data, the metadata comprising storage location information specifying a storage location for the coded data and/or encoder information specifying the type of encoding for the coded data. The storage location information specifying a storage location for the error correction coded data may comprise a storage device persistent name, a logical block address, a device number, a logical unit number, a volume serial number or other storage location identifiers. Processor 82 may be used to implement a metadata controller to locate the desired metadata 88 from nonvolatile memory 83, in step 707.

From step 707, the process flows to step 708, where controller 80 uses a read command (i.e. read command 605 FIG. 2)) to read the coded information from individual storage 91-93 and place it into RAM 84. For example, referring to FIG. 5, V(1,1), V(1,2), V(4,1), V(4,2) V(7,1), V(7,2), V(10,1), V(10,2) etc., are read from drive 281; V(2,1), V(2,2), V(5,1), V(5,2) V(8,1), V(8,2), V(11,1), V(11,2) etc., are read from drive 282; and V(3,1), V(3,2), V(6,1), V(6,2) V(9,1), V(9,2), V(12,1), V(12,2) etc., are read from drive 281 to complete coded data 290. Within read command 605 are the logical unit number 609 (obtained from metadata 88, FIG. 3) of the target storage device, the starting logical block address 607 (obtained from metadata 88, FIG. 3) and the transfer length 608 (obtained from metadata 88, FIG. 3) of the coded data stored on the storage device at logical unit number 609. Read command 605 maybe implemented across a SCSI or Fibre Channel interface. Read command 605 is a SCSI read command and it is only one possible read command which could be used. Read command 605 may be used more than once to retrieve the coded data from storage devices 91-93. Read command 605 is typically used at least once for each storage device.

Figure 4:
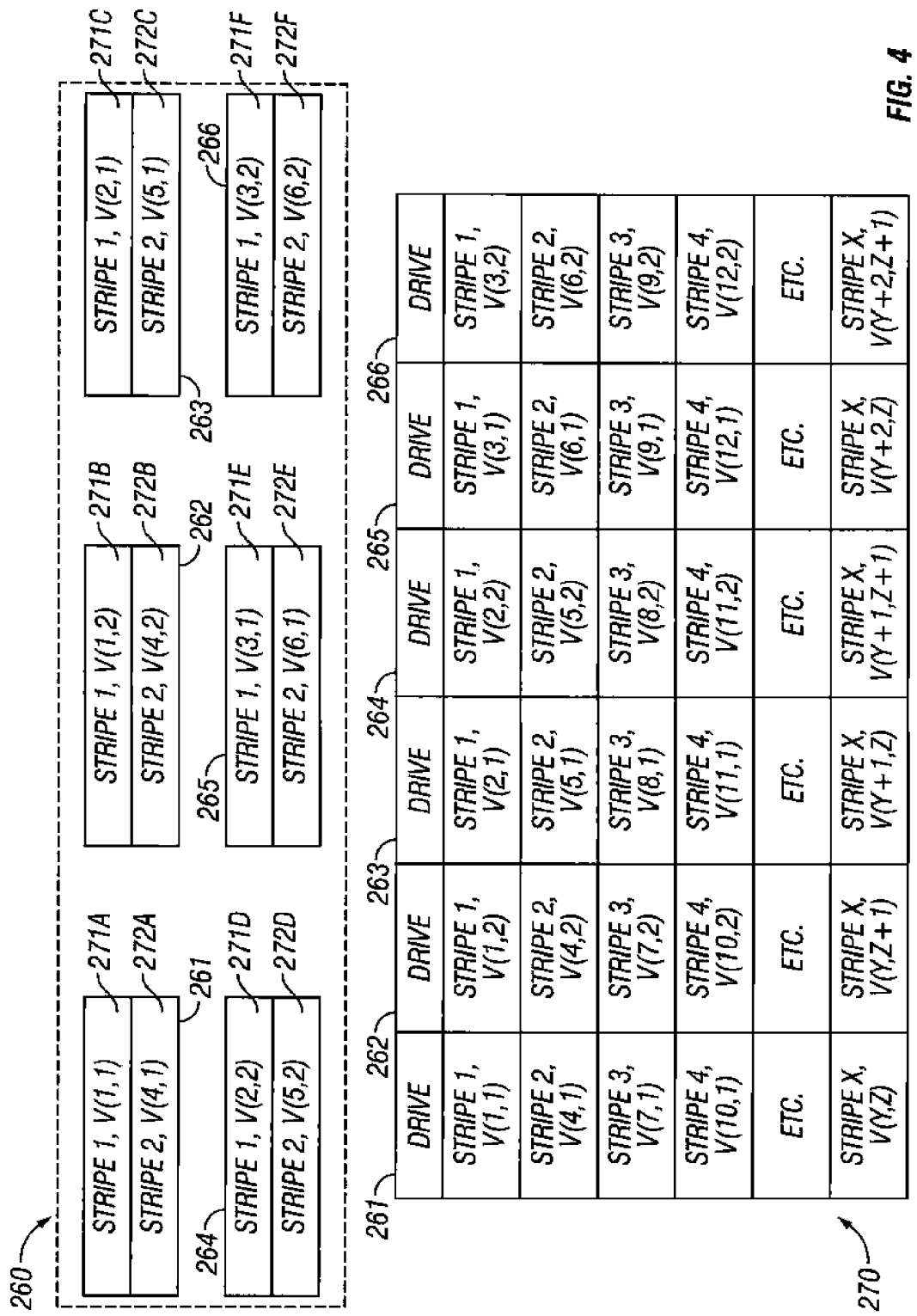
FIG. 4 illustrates a convolution RAID with 1-bit wide stripes for 2-bit word-output encoders.

FIG. 4 shows an example of error correction coded data distributed to storage devices (260), when a (2,1,3) binary convolution encoder (FIG. 14) was used to process the information to produce error correction coded data. Each word of the error correction coded data may comprise, for example two bits (n=2) as shown in FIG. 4, the first word comprises V(1,1) and V(1,2), the second word comprises V(2,1) and V(2,2), the third word comprises V(3,1) and V(3,2), etc. For this example, none of the of storage devices receives more than one of the two bits of each the word.

Figure 5:
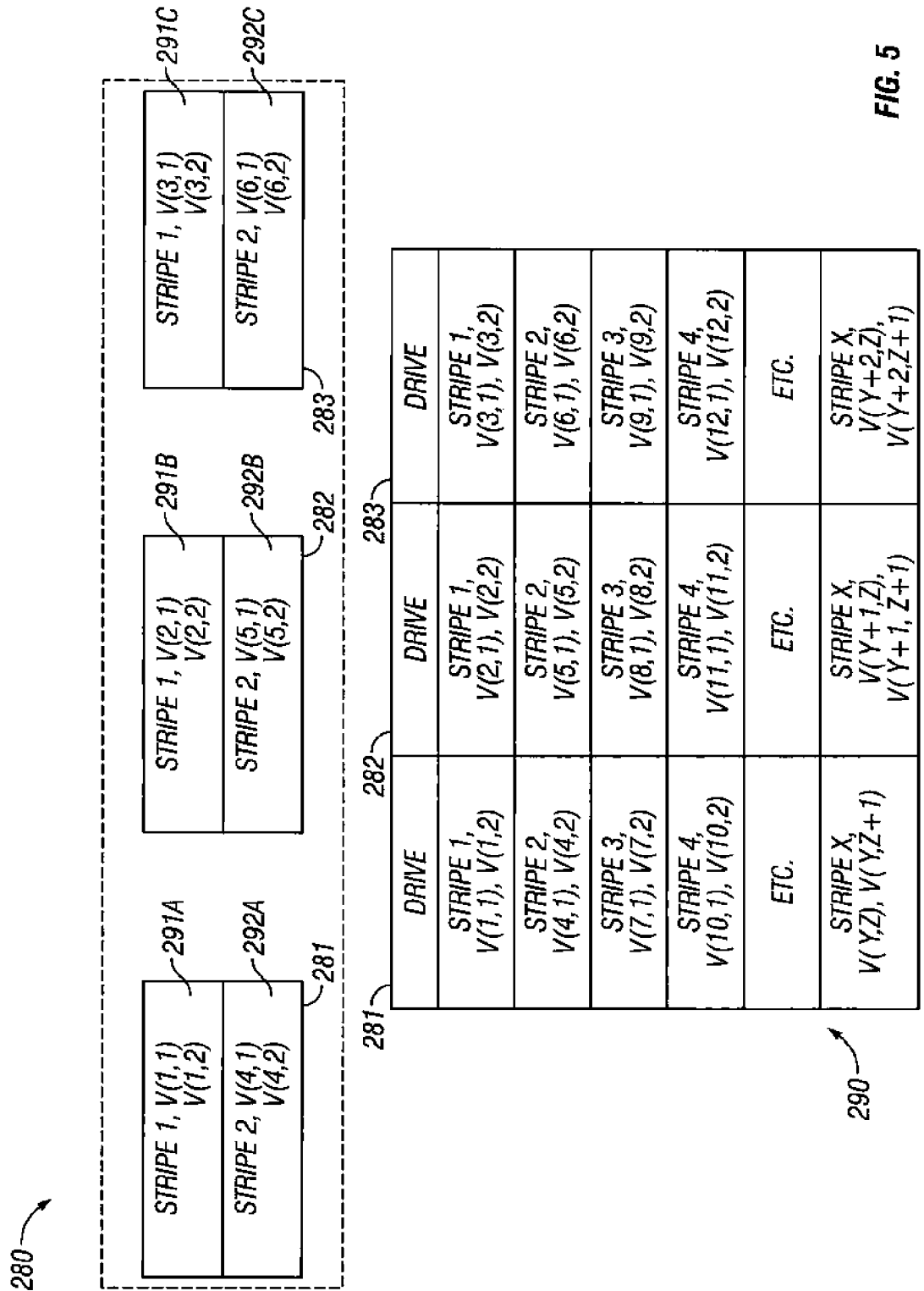
FIG. 5 illustrates a convolution RAID with 2-bit wide stripes for 2-bit word-output encoders.

FIG. 5 shows an example of error correction coded data distributed to storage devices (280), when a (2,1,3) binary convolution encoder (FIG. 14) is used to process the information to produce error correction coded data. Each word of the error correction coded data may comprise, for example two bits (n=2) as shown in FIG. 5, the first word comprises V(1,1) and V(1,2), the second word comprises V(2,1) and V(2,2), the third word comprises V(3,1) and V(3,2), etc. For this example, none of the of storage devices receives two or more consecutive words. For this embodiment, consecutive words comprises, for example, first word (V(1,1), V(1,2)) and second word (V(2,1), V(2,2)) or second word (V(2,1), V(2,2)) and third word (V(3,1) and V(3,2)). Examples of non consecutive words are: first word (V(1,1), V(1,2)) and third word (V(3,1) and V(3,2)) or second word (V(2,1), V(2,2)) and fourth word ((V(4,1), V(4,2)).

For the data distribution shown in FIG. 4, read command 605 could be invoked six times in step 708, to read the information stored in storage devices 261-266. For the data distribution shown in FIG. 5, read command 605 could be invoked three times in step 708, to read the information stored in storage devices 281-283.

Once all of the coded data has been read from each drive and placed into RAM 84, the process flows to step 709 where controller 80 assembles the coded data from each drive into coded data 87. Examples of coded data 87 assembled from the coded data read from each drive are 270 (FIG. 4) and 290 (FIG. 5). This assembly is based on the sequence number 625 in metadata 88, where the sequence number determines the proper assembly of coded data 87 from the coded data previously spread across the RAID.

Similarly, FIG. 4 also shows a table (270) of an example of error correction coded data as stored in a memory device, for example RAM 84, in step 709. Table 270 is organized into columns, where each column comprises error correction coded data that was read in step 708 from a respective storage device (i.e. storage devices 91-93). For example, the first column of table 270 shows the error correction coded data read from drive 261 in step 708.

FIG. 5 also shows a table (290) of an example of assembled error correction coded data 87 as assembled in a memory device, for example RAM 84, in step 709. Table 290 is organized into columns, where each column comprises error correction coded data that has been read in step 708 from a respective storage device. For example the first column of table 290 shows the error correction coded data read from drive 281 in step 708.

After the completion of step 709, where coded data 87 has been assembled in RAM 84, the process flows to step 711 where coded data 87 is decoded to produce decoded data (i.e. information 78). Step 711 may be accomplished by a trellis decoder (i.e. trellis decoder 77 in specific circuits 81, which decodes the coded data 87 to obtain the original information 78 for one or more of hosts 61-65) coupled to storage devices (i.e. by use of coded data 87 assembled in RAM 84). Trellis decoder 77 may be adapted to process coded data received from storage devices 91-93 to produce decoded data. The coded data comprising error correction coded data produced by the convolution of present and past bits of information 78. Decoder 77 may be a trellis decoder represented by the diagrams of FIG. 7 or 11, or any other trellis decoder. Alternately, decoder 77 could employ a "stack algorithm" which can be considered a binary, tree-like implementation of a trellis diagram.

Figure 11:
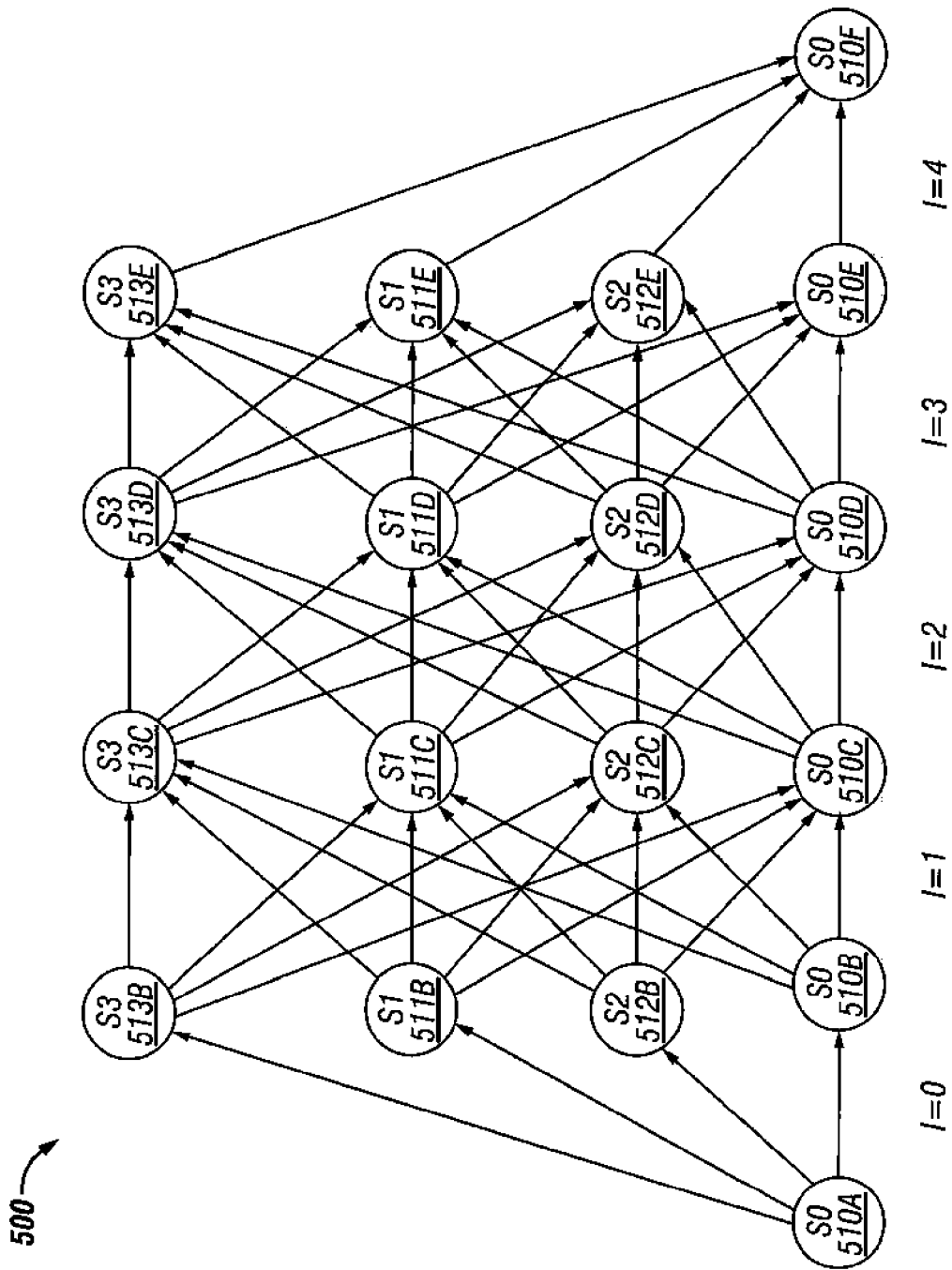
FIG. 11 illustrates a trellis decoder for (3,2,1) code.

In certain embodiments, decoder 77, consists of expanding the state diagram of the encoder (FIG. 12) in time, to represent each time unit with a separate state diagram. The resulting structure is called a trellis diagram, as shown in FIGS. 7 and 11. The path through the trellis diagram with the smallest Hamming distance is the desired path for decoding (i.e. reading) the coded data 87 to produce the desired information 78. The preferred smallest Hamming distance is zero, meaning that there is no error between coded data 87 and the path chosen through the trellis diagram to decode that coded data 87 into information 78.

The Hamming distance is calculated by the word read for that branch of trellis diagram, and the word assigned to each path in that branch. The read word and the assigned word are added without carryover (XOR) to produce the Hamming distance for each path in that branch. For example if 111 was the word read, but a path had an assigned word of 010 the Hamming distance is 111+010101.

It is desired that the Hamming distance in each branch be zero. For example, if 111 was the word read, and there was a path in that branch with an assigned word of 111, then 111+111=000 would represent a zero Hamming distance. That path would be the desired path for that branch and the information assigned to that same path would then represent the original information before the encoding took place.

If a zero Hamming distance is not achieved, then all possible paths through the trellis diagram are calculated for the read encoded data, and the path with the minimum Hamming distance across all branches is chosen as the path representing both the encoded data and the original information. Thus, the trellis diagram is in fact a maximum likelihood decoding algorithm for convolutional codes, that is, the decoder output selection is always the code word that gives the smallest metric in the form of the Hamming distance.

For the read (decoding) process, the first branch of the trellis diagram always emanates from state $S_0$ and the last branch of the trellis diagram always terminates at state $S_0$. This is indicative of beginning and ending the encoding process with all memory initialized to zero in the convolution encoder, such as memory 230-232 in FIG. 14.

For proper operation, decoder 77 obtains the ordering of the bits which comprise the words from metadata 88, via stripe width 624. For example, the bits in table 270 (FIG. 4) and table 290 (FIG. 5) are arranged differently. By accounting for the stripe width 624 in metadata 88, the individual bits of encoded data are processed in the correct order by trellis diagrams 300 (FIG. 7) and 500 (FIG. 11).

In certain embodiments the coded data comprises one or more words, each word comprising n bits, where n is greater than zero, each word produced from a convolution encoder processing a portion of information and where none of the plurality of storage devices has more than one of the n bits of each word.

In certain embodiments the coded data comprises one or more words, each word comprising n bits, where n is greater than zero, each word produced from a convolution encoder processing a portion of information and where none of the plurality of storage devices has two or more consecutive words.

From step 711, the process flows to step 712, to determine if all of the coded data necessary to produce the information requested by a requester has been decoded by decoder 77. If the answer is YES, the process flows to step 713, where host information interface 89 receives information 78 from decoder 77 and any other components coupled to controller 80 (i.e. processor 82, specific circuits 81, etc.) which may be necessary to enact that transfer, and transfers information 78 derived from coded data 87 to the requesting host 61-65. Information 78 may be temporary stored in a memory device (i.e. RAM 84, nonvolatile memory 83, a dedicated processor memory, etc.) before, during or after decoder 77 processes error correction coded data 87. The error correction coded data 87 and/or the derived information 78 may be stored in RAM (i.e. RAM 84) in advance of distribution to the requesting host computers 61-65 of SAN 10. Alternatively, the error correction coded data 87 may be stored in nonvolatile memory 83, another memory device, cache memory, etc as it is being assembled from the segments being read (by read command 605 of FIG. 2) from the storage devices. In certain embodiments, error correction coded data 87 is stored in RAM 84 in a format identical to the format that was used previously for distribution to the storage devices for storage.

If at step 712, all of the coded data 87 has been decoded, then step 713 is executed. Step 713 sends the information 78 requested by the requestor to the requester and returns program control to step 705 to process another request. If at step 712, more coded data 87 needs to be decoded, then step 715 is executed.

At step 715, the trellis decoding of coded data 87 may detect errors. In certain embodiments, each time that a non-zero Hamming distance is uncovered in the decoding process, a decoding error is detected. If there are no errors detected in the decoding of the coded data 87, (i.e. a path is found in either trellis diagram 300 or 500 with zero Hamming distance) then control flows back to step 711 to continue the decoding process. In certain embodiments, step 715 is implemented by continuously examining the decoding of the coded data to detect errors via non-zero Hamming distances. Alternately, the decoding process may be examined periodically. For example, continuously or periodically examining may comprise examining bit by bit, multiple bits, word by word, multiple words or other portion of coded data, decoded data or derived information to detect errors. In there are errors in the coded data, decoded data, derived information or combinations thereof then control flows to step 720 to determine if a storage device has failed.

If at step 720, a storage device has not failed, then step 722 is executed. At step 722, the errors are corrected and control returns back to step 711 to resume decoding coded data 87. This error correction would consist of backing up the decoding process to before an error (non-zero Hamming distance) existed that then resuming the decoding process while looking at all possible paths for the minimum Hamming distance. This minimum Hamming distance is preferably zero.

In one embodiment step 720 is accomplished by measuring a quantity of ECC (error correction code) errors in reading of the encoded data within individual storage devices (i.e., within each of storage devices 91-93) and comparing the quantity of ECC errors to an error limit within each of the storage devices (i.e. storage devices 91-93), in step 715. In response to the quantity of ECC errors exceeding the error limit for a given storage device, the system identifies that storage device as a failed storage device in step 720.

In an alternative embodiment, step 720 is accomplished by receiving Self Monitoring Analysis and Reporting Technology (i.e. S.M.A.R.T. technology) information from each storage device (i.e. storage devices 91-93) and in response to the self monitoring analysis and reporting technology information indicating a failure for a storage device, identifying that storage device as a failed storage device.

S.M.A.R.T. is an acronym for Self-Monitoring Analysis and Reporting Technology. This technology is intended to recognize conditions that indicate a drive failure (i.e. storage devices 91-93) and is designed to provide sufficient warning of a failure to allow data back-up before an actual failure occurs. A storage device may monitor specific attributes for degradation over time but may not predict instantaneous drive failures.

Each attribute for degradation monitors a specific set of failure conditions in the operating performance of the drive, and the thresholds are optimized to minimize "false" and "failed" predictions S.M.A.R.T. monitors the rate at which errors occur and signals a predictive failure if the rate of degraded error rate increases to an unacceptable level. To determine rate, error events are logged and compared to the number of total operations for a given attribute. The interval defines the number of operations over which to measure the rate. The counter that keeps track of the current number of operations is referred to as the Interval Counter.

S.M.A.R.T. measures error rate, hence for each attribute the occurrence of an error is recorded. A counter keeps track of the number of errors for the current interval. This counter is referred to as the Failure Counter. Error rate is simply the number of errors per operation. The algorithm that S.M.A.R.T. uses to record rates of error is to set thresholds for the number of errors and the interval. If the number of errors exceeds the threshold before the interval expires, then the error rate is considered to be unacceptable. If the number of errors does not exceed the threshold before the interval expires, then the error rate is considered to be acceptable. In either case, the interval and failure counters are reset and the process starts over.

S.M.A.R.T. signals predictive failures when the drive is performing unacceptably for a period of time. Firmware keeps a running count of the number of times the error rate for each attribute is unacceptable. To accomplish this, a counter is incremented whenever the error rate is unacceptable and decremented (not to exceed zero) whenever the error rate is acceptable. Should the counter continually be incremented such that it reaches the predictive threshold, a predictive failure is signaled. This counter is referred to as the Failure History Counter. There is a separate Failure History Counter for each attribute.

In an alternative embodiment, a failed storage device is determined in step 720 as a storage device which controller 80 cannot establish I/O communications with, for example, across coded data interface 85.

If a storage device fails, flowchart 700 can be accessed via step 719 to flow directly to step 725. It is not necessary for a read operation to occur to search for a failed drive and to begin the reconstruction of the encoded data previously held by the failed drive.

In response to determining that there is a failed storage device at step 720, step 725 is executed to allocate storage space for the storage of reconstructed data. In certain embodiments step 725 is accomplished by using a spare storage device (i.e. spare storage device 97) for the allocated storage space. If such a spare storage device 97 is employed to replace one of storage devices 91-93, spare storage device 97 would have as much or more storage capacity as the failed device which it is replacing. Additionally, spare storage device 97 would preferably be of the same type of storage, namely if storage 91-93 were hard disk drives with fibre channel connectivity, then spare storage device 97 would also be a hard disk drive with fibre channel connectivity. In certain embodiments the allocated storage space may comprise one or more of storage devices 91-93, portions of storage devices 91-93, an external storage device internal or external to SAN 10, a memory device coupled to controller 80, etc. In certain embodiments, the reconstructed data comprises coded data (i.e. data produced by a convolution encoder) previously stored on the failed storage device.

From step 725, the process flows to step 730, to accomplish (1e, 14e, 8f) processing the decoded data to produce the reconstructed data and storing the reconstructed data on the allocated storage space. Steps 730 and 735 may be accomplished by, for example, controller 80 processing decoded data by use of trellis decoder 77 and reconstructing an image of the data that was stored on the failed storage device, via constructing the entire contents of table 270 (FIG. 4) or table 290 (FIG. 5) in RAM 84, and storing the column of that image, corresponding to what had been on the failed drive, onto the allocated storage space (i.e. spare storage 97) using a write command (i.e. write command 600, FIG. 15). The image may be temporarily stored in a memory device (i.e. RAM 84) before, during or after the reconstruction process. This reconstruction process also recovers the information originally provided by the host. Thus, the reconstruction process also decodes the previously encoded data and the reconstruction process can be considered part of the read process, if the read process requires the reading a segment of encoded data which had been stored on a failed device. If a user desires the reading (decoding) of data on a failed convolution encoded RAID, such as in FIGS. 4-5, the same reconstruction process which recovers the missing encoded data from the failed storage device or devices also provides the user with the desired information. In certain embodiments, the system may be adapted to charge a customer (i.e. a user) a fee for storing the reconstructed data on the allocated storage space. The fee may be billed to the customer by the system, a service provider, a third party etc. The fee may be based upon the amount of storage space used, a flat fee, the number of allocated storage devices used, etc. This may be accomplished by, for example a customer agreement with a service provider to store data, where the service provider is responsible for storing and retrieving a customer's data, on demand. The service provider may be the manager of the storage system and/or a third party in a business relationship between the customer and another entity. The customer may be provided with a connection to a system for storing information (i.e. SAN 10, FIG. 1). The customer may send his information to the system for storage using the connection or other means. The amount or quantity of information sent by the customer or received by SAN 10 and/or controller 80 may be measured by methods known in the art for measuring the amount of data. The fee for storing reconstructed data on the allocated storage space could be determined by considering the amount of information sent for storage and other factors such as: rate of information flow, frequency of use, compressed or non-compressed information, fixed monthly rate or other considerations. From step 735, the process flows to step 740, to end.

In certain embodiments, steps 720, 722 and 730 are accomplished by operation of decoder 77. Decoder 77 may be implemented as a trellis decoder to decode coded data read from RAID storage devices (i.e. storage devices 91-93). The operation of a trellis decoder is explained below.

Figure 8:
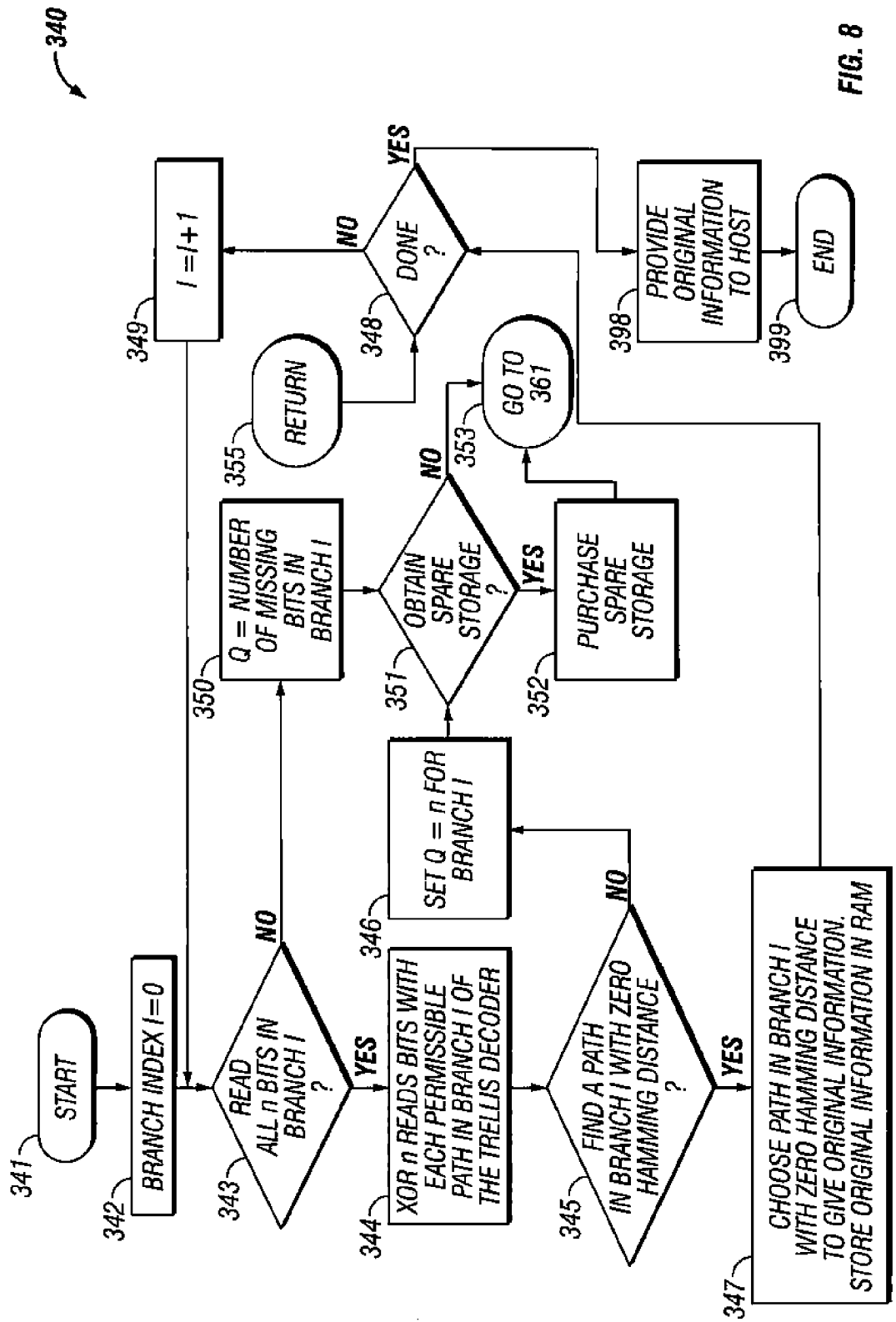
FIG. 8 illustrates a flowchart for using a trellis decoder to detect missing encoded data.
Figure 9:
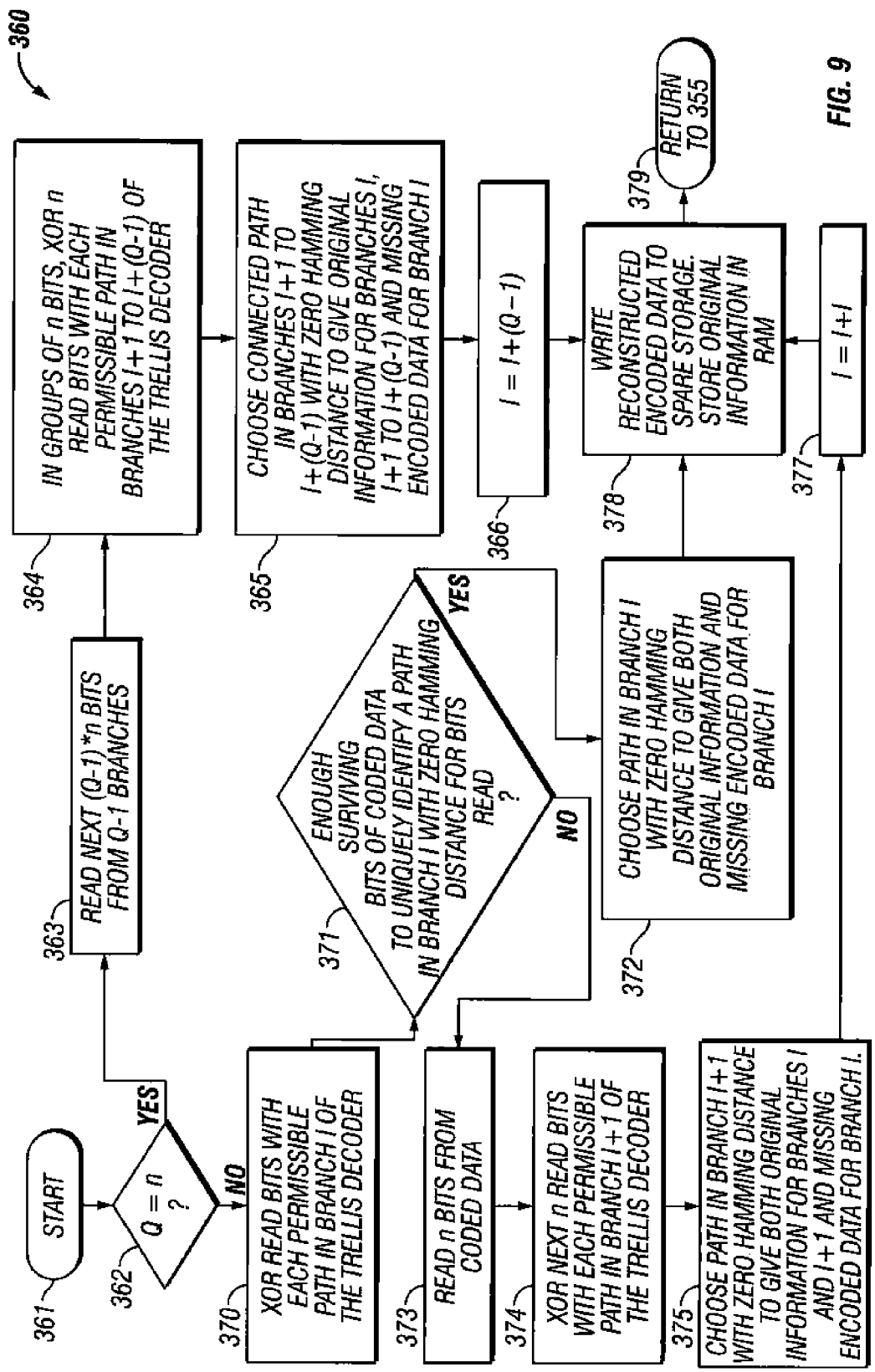
FIG. 9 illustrates a flowchart for using a trellis decoder to reconstruct missing encoded data and the information it represents.
Figure 10:
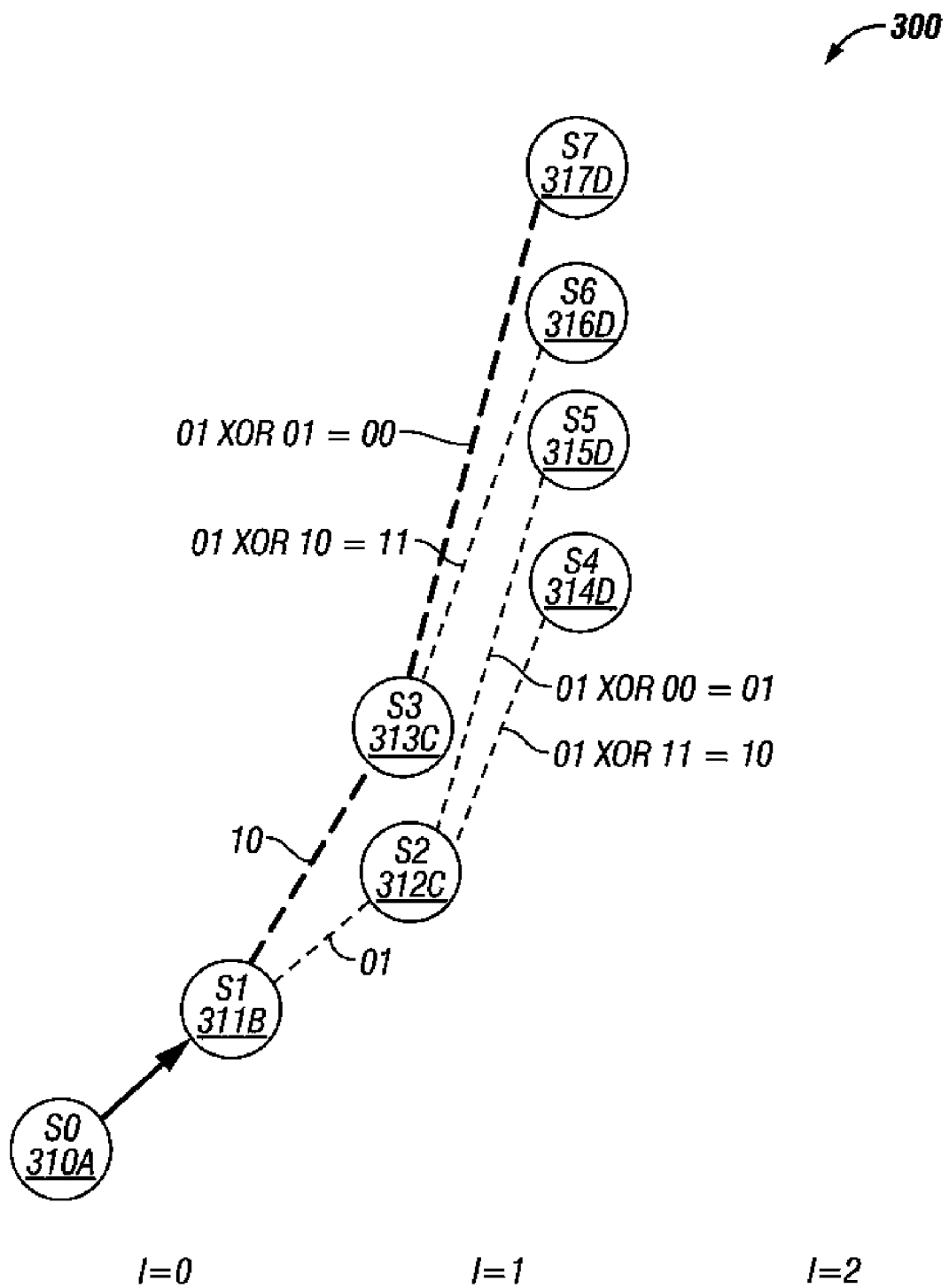
FIG. 10 illustrates a trellis decoder for (2,1,3) code, and with the reconstruction of missing information.
Figure 12:
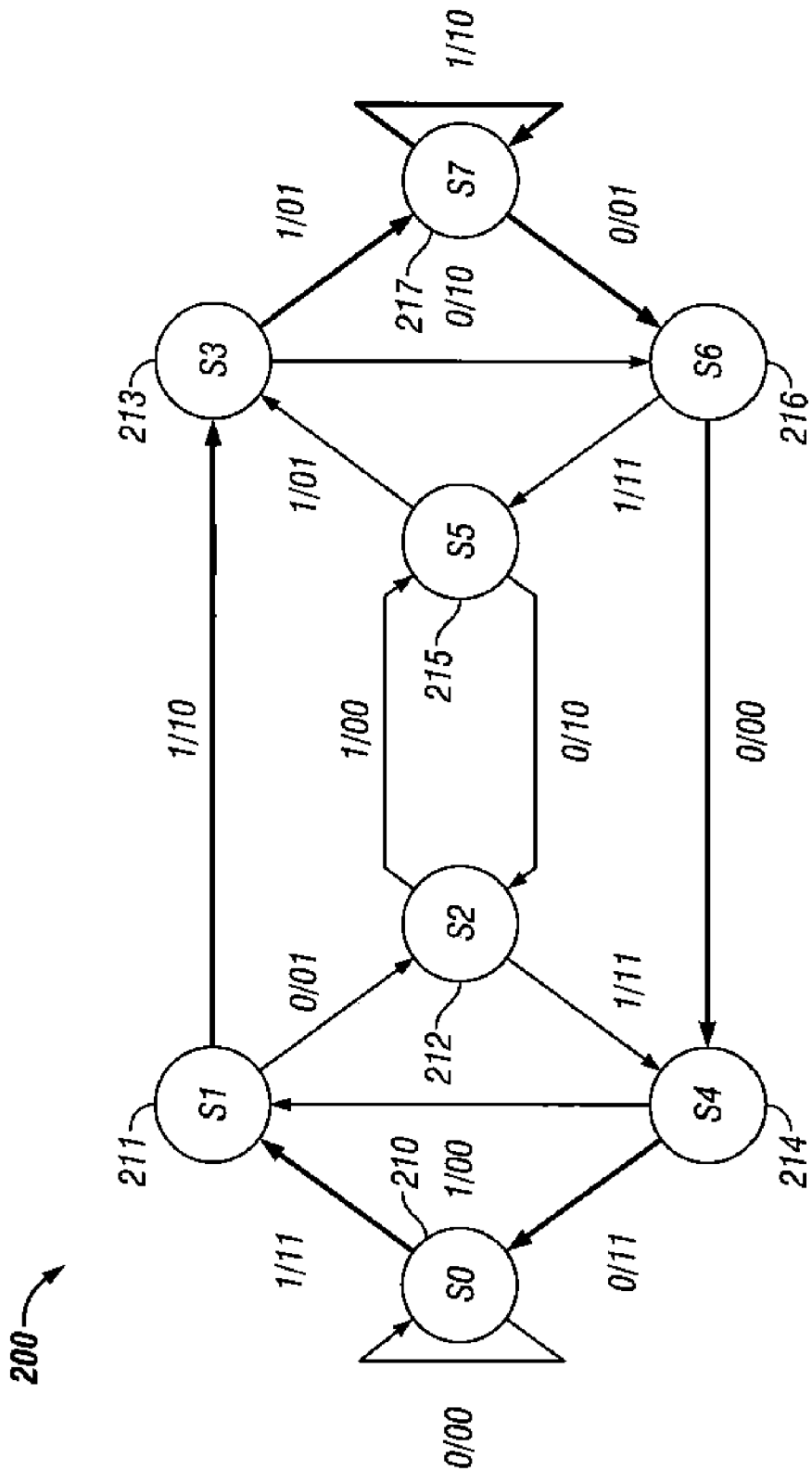
FIG. 12 illustrates an encoder state diagram for a (2,1,3) error correction code.

In certain embodiments, steps 720 and 722 are accomplished by steps 341, 342, 343, 344, 345, 347 and 348 of flowchart 340 illustrated in FIG. 8, and flowchart 360 illustrated in FIG. 9, for the trellis decoding in FIGS. 7, 10, and 11. In FIG. 8, the process begins with step 341. The process flows to step 342, where the branch index I is set to zero. A branch of the trellis diagram represents one word of the output of the convolution encoder (FIG. 12). For example, trellis diagram 300 has two bits in a word, and trellis diagram has three bits in one word. The branch index I is important because the trellis decoder typically sequentially decodes one branch at a time when a zero Hamming distance is obtained, which means that no errors have been detected and there is no missing data from a failed storage device and that a single path in branch index I has been identified which corresponds exactly with the encoded data word in coded data 87. The value of the trellis decoder is that it can "look ahead, out of sequence, by branch" and bypass branches with errors, and use those branches which follow the errant branch to correct that errant branch.

From step 342, the process flows to decision step 343, where the determination is made whether all n bits of a word of coded data 87 were obtained from the storage devices 91-93 or if some of the bits are missing for branch I. Each word comprises n bits, and each set of n bits comprises one branch in trellis decoder 300 and 500. If all n bits were obtained for branch I, the process flows to step 344 where the XOR (exclusive OR) operation is performed between (a) all n bits of the encoded data obtained from coded data 87 and (b) the state transitions in the pats comprising branch index I of trellis diagram 300 of FIG. 7 (or, alternately, trellis diagram 500 of FIG. 11). For example, for branch index I=0 of trellis diagram 300 of FIG. 7, the encoded data read is 11 (a single word of encoded data is processed at a time). Trellis diagram allows transitioning from $S_0$ 310A to either $S_0$ 310B or $S_1$ 311B. The transition from $S_0$ 310A to $S_0$ 310B represents the encoded data 00 and the transition from $S_0$ 310A to $S_1$ 311B represents the encoded data 11. The XOR process between the read data of 11 and the transition from $S_0$ 310A to $S_1$ 311B gives a zero Hamming distance (zero error) in decision step 345 (11 XOR 11=00), indicating that this is the proper choice to make between the two possibilities and that the decoded and desired decoded information is a 1. If a path is identified with zero Hamming distance (zero error) in decision step 345, the process flows to step 347 where that path with zero Hamming distance is chosen as the correct path. The process then flows to decision step 348, where the assessment is made whether the process has concluded by whether all data has been processed per metadata 88, which determines the size of coded data 87. Assuming the process is not concluded yet in step 348, the branch index I is increased by I in step 349 and the process returns to attempt to read more data in step 343. If the process is completed in step 348, the process proceeds to step 398 where the original information 78 which was obtained by decoding coded data 87 is sent to one of hosts 61-65, and then the process ends in step 399.

In certain embodiments, steps 720, 725, 730 and 735 (FIG. 6) are accomplished by arriving at step 351 via step 343 of flowchart 340 illustrated in FIG. 8 for the trellis diagram 300 of FIG. 7 or trellis diagram 500 of FIG. 11. If in decision step 343, all n bits were not obtained (i.e., all bits of a branch were not obtained, as is shown as the I=1 dotted-line path of FIG. 10), the process flows to step 350 where the number of missing bits Q is determined. For example, for a word of length, n=2 bits, Q could be 1 in the case of one of devices 263-264 (FIG. 4) has failed and the other is fully operational. However, Q would be equal to n if one of devices 281-283 (FIG. 5) failed, The process then flows to decision step 351, where the query is made whether spare storage is already available, such as spare storage 97 of FIG. 1. If the answer is no in step 351, the process flows to step 352 where spare storage is obtained by the user to replace failed storage. In certain embodiments, the system may be adapted for charging a customer (i.e. the user) a fee for allocating storage space for the spare storage. Obtaining spare storage 97 may involve the user purchasing the spare storage, for example, if the warranty has expired for the failed storage. This purchase would typically be made electronically, when the customer first invokes the spare storage. If the warranty period is still active, then spare storage may be provided for free.

In certain embodiments, the spare storage devices remains unpurchased by the user until the spare storage devices are needed by the user. The cost of the spare storage may be zero, if the spare storage is invoked during a warranty period. Step 352 could also include the automatic shipment of replacement spare storage by the manufacturer as existing spares are utilized. This replacement spare storage would be placed where the failed storage was removed. In certain embodiments, the replacement storage may be located in a different physical location then storage devices 91-93. For example, the replacement storage may be accessed on demand, by a high speed interface (i.e. internet, intranet, TCP/IP, etc.). The failed storage may be returned to the factory for failure analysis, as part of the warranty agreement. Then the process flows from step 352 to step 353 where a transition is made to step 361 of flowchart 360 of FIG. 9. If in step 351 the answer is yes, the process flows directly to step 352 and to step 353. In certain embodiments the storage devices (i.e. storage devices 91-93 in RAID 90) are disbursed to separate physical locations. For example, storage devices 91, 92 and 93 may each be physically separated from each other by locating storage devices 92-93 in different rooms, buildings, cities, states, countries, etc.

In FIG. 10, it is assumed that the encoded data comprises words of two bits, such as data encoded by the encoder shown in FIG. 12. It is also assumed that a pair of adjacent devices with a 1-bit wide stripe such as devices 263-264 in FIG. 4, or a single device with a 2-bit wide stripe such as device 282 of FIG. 5 has lost all data, due to a catastrophic failure. FIGS. 8-9 show how that data is reconstructed in case it cannot be read in step 343 of flowchart 340.

In certain embodiments, steps 720, 725, 730 and 735 (FIG. 6) are accomplished by arriving at step 351 via step 346 of flowchart 340 illustrated in FIG. 8. If in decision step 345, a path with zero error is not identified, the process flows to step 346 where all n bits of the processed word are assumed to be errant, by setting Q=n, and the process flows to aforementioned decision step 351 and then to step 361 of flowchart 360 (FIG. 9).

In FIG. 9, the process starts in step 361 and flows to decision step 362, where the determination is made whether all bits n in branch I are lost, (i.e. Q=n), and all n bits need to be reconstructed because of the loss of branch I. If the answer is yes in step 362, the process flows to step 363, where lost branch I is skipped over and a total of (Q−1)*n more bits are read from the next Q−1 branches, which represents Q−1 words. This is the value of the trellis diagram, where it is possible to "look ahead" and use subsequent branches to determine missing encoded data from branch I. Then, in step 364, the XOR (exclusive OR) process is performed in groups of n bits between the n read bits and the permissible paths in the I+1 to I+(Q−1) branches of trellis diagram 300. Then in step 365, the desired paths in branches I+1 to I+(Q−1) branches are those branches with zero Hamming distance (i.e., zero error) and those previously identified branches which connect to each other with zero Hamming distance. A zero Hamming distance is equivalent to a zero error in the decoding.

Once the decoding path is established in branches I+1 to I+(Q−1), the missing branch I is reconstructed as that path which connects the path in previously identified branch I and newly identified branches I+1 to I+(Q−1). This "connectivity" is critical in establishing the correct path through the trellis diagram. The entire decoded path, shown as the highlighted line in trellis diagram 300 of FIG. 7, is achieved by the continuous connection of the individual paths in each branch in the trellis diagram. It is this reconstructed path, identified by zero Hamming distance, which is written to the spare devices purchased in step 351. Then the process flows from step 365 to step 366 (FIG. 9), where the branch index is incremented by Q−1 to account for the branches decoded during this phase of the reconstruction process. Then the process flows from step 366 to step 378 where the restored missing encoded data is stored on the spare storage. Then the process flows from step 378 to step 379 where the process returns to step 355 of FIG. 8.

FIG. 10 gives an illustrative example of data reconstruction for data encoded via the (2,1,3) convolution encoder shown in FIG. 12 In the case of FIG. 10, all data lost is that comprising branch index I=1, which means that Q=2 lost bits and Q=n. The final known state is $S_1$ 311B, which was just calculated for branch index I=0. FIG. 10 was created from trellis diagram 300 of FIG. 7, with all the impossible states removed from trellis diagram 300. For FIG. 10, for branch I=1, from $S_1$ 311B, the only permissible transitions are to $S_2$ 312C and $S_3$ 313C and the determination of which of these two transitions was actually made by the encoded data needs to be made in order to reconstruct the missing/destroyed encoded data of branch I. To reconstruct the missing data, for branch I=1, flowchart 340 (FIG. 8) "looks ahead" and the encoded data is read from coded data 87 for branch I+Q−1, which is branch I=2 (Q=2), as described in steps 364, and that encoded data is 01 per FIG. 10. The transition from $S_2$ 312C to $S_4$ 314D represents 11 per table 290 of FIG. 13, and the transition from $S_2$ 312C to $S_5$ 315D represents 00. Similarly the transition from $S_3$ 313C to $S_6$ 316D represents 10 per table 290 of FIG. 13, and the transition from $S_3$ 313C to $S_7$ 317D represents 01.

Per step 364 of flowchart 360 (FIG. 9), the XOR process between the encoded data read for branch I=2 (I+Q−1=2) and the encoded data represented by the four possible paths for branch I=2 gives the following results: for $S_3$ 313C to $S_7$ 317D, 01 XOR 01=00, $S_3$ 313C to $S_6$ 316D, 10 XOR 01=11, $S_2$ 312C to $S_5$ 315D, 00 XOR 01=01, and $S_2$ 312C to $S_4$ 314D, 11 XOR 01=10. Thus, $S_3$ 313C to $S_7$ 317 represents the only viable path based on a zero Hamming distance (01 XOR 01=00) for branch I=2. Based on the required connectivity between decoded paths in a trellis diagram, the missing encoded data must be represented by the transition from $S_1$ 311B to $S_3$ 313C in branch I=1 and missing encoded data is 10. Thus the encoded data for branch I=1 and I=2 is 10 and 01 and the decoded information is 11 for these two branches. Because the decoding was done for two branches, the branch index must be increased by Q−1=1 in step 366 and again by one in step 348, assuming the decoding process to be ongoing. The reconstructed encoded data is stored on spare storage 97 of RAID 90. If this reconstruction was done as part of a user-initiated read process, the original information obtained as part of the reconstruction process is placed in RAM 84, for example, for eventual transmission to one of hosts 61-65.

Steps 363-366 (FIG. 9) reconstructs all n bits in branch I. If in step 362, Q is not equal to n, then some but not all bits of branch I have been recovered and the process flows from step 362 to step 370 for the partial reconstruction of branch I.

In step 370, the available bits which are read are XOR'd with each permissible path in branch I of the trellis decoder. The process then flows from step 370 to decision step 371, where the decision is made whether there is enough surviving information to uniquely identify the desired path in branch I with zero errors for the bits read. If the answer is yes, the process flows to step 372, where the path in branch I is chosen with zero error to give both the original data and the missing encoded data. Then the process flows from step 372 to step 378 where the restored missing encoded data is stored on the spare storage. Then the process flows from step 378 to step 379 where the process returns to step 355 of FIG. 8.

An example of partially complete information in branch I of FIG. 10 is if one bit is retrieved for branch I=1, and one bit is missing. The presence of partially recovered data in branch I=1 is detected in step 362 of FIG. 9. The path from $S_1$ 311B to $S_2$ 312C represents the encoded data 01. The path from $S_1$ 3113 to $S_3$ 313C represents the encoded data 10. Thus, if either the lead bit or trailing bit of the two-bit pair of data is available, this is sufficient to determine the correct path for branch I=1 of FIG. 10, via steps 371-372 of FIG. 9. For example, if the lead bit is a 1 and the trailing bit is the lost bit, then, the reconstructed encoded data is 10 based on the only permissible path in branch I=1 with a leading I is $S_1$ 311B to $S_3$ 313C, i.e. it is the only permissible path which would result in a zero Hamming distance. The reconstructed data is then stored on spare storage 97 of FIG. 1 in step 378 of FIG. 9. If this reconstruction was done as part of a user-initiated read process, such as process 700 of FIG. 6, the original information obtained as part of the reconstruction process is placed in RAM 84.

If in step 371 there are not enough surviving bits of coded data to uniquely identify a path in branch I with zero Hamming distance for the bits read, the process flows to step 373 where the next n bits are read from coded data 87 to form the word which is analyzed in branch I+1 of the trellis diagram, and then the process flows to step 374. In step 374, the XOR of n read bits with each permissible path in branch I+1 of the trellis decoder is accomplished to isolate the path with zero Hamming distance (zero error). FIGS. 7 and 11 are examples of specific trellis decoders 300 and 500. Paths in branch I+1, which are incompatible with the partially read branch I, are not considered permissible and are ignored. The process flows from step 374 to step 375, where the process chooses the path in branch I+1 with zero Hamming distance (zero error). The path in branch I is chosen so that the path already identified in branch I−1 and I+1 are all connected, which means that the individual branch paths must be connected to the paths in the adjacent branches all the way across the trellis diagram. In this manner, the missing encoded data for branch I and the original information for both branch I and branch I+1 is identified. Then the process flows from step 375 to step 377, where the branch index I in incremented by unity. Then the process flows from step 377 to step 378, which has already been described.

If there are three bits in a word, such as taught by trellis diagram 500 of FIG. 11, then recovery of branch I may take a "look ahead" of branch I+1 and I+2 in order to find the connected path through branches I−1, I, I+1 and I+2 with zero Hamming distance.

Data reconstruction may be done, after a failure, either by using a background process or by use of a foreground process. A background process is where controller 80 performs data reconstruction independently of any involvement of hosts 61-65. A foreground process is where controller 80 is specifically requested to reconstruct data by one of hosts 61-65. Data may be reconstructed in the background from the very first stripe to the very last stripe. Also, data can be reconstructed in the foreground, when demanded by the customer, because data files are encoded independently from one another. Once data is reconstructed in the foreground, it need not be reconstructed in the background, provided that controller 80 monitors the reconstruction effort in the background and scans for what files have already been reconstructed in the foreground. It is not necessary for the encoded data to be reconstructed twice, once in the foreground (based on user demand as requested by one of hosts 61-65) and again in the background (because the background process run by controller 80 ignored that the missing encoded data was already reconstructed in the foreground).

State diagram 200 for (2,1,3) binary convolution encoding is shown in FIG. 12. It is trellis decoder 300 of FIG. 7, which is used during read process 700 of FIG. 6 from RAID 90 to one of hosts 61-65, which decodes the coded data 87 created by state diagram 200 during the original write process from one of hosts 61-65 to RAID 90. State diagram 200 comprises eight states: $S_0$ 210, $S_1$ 211, $S_2$ 212, $S_3$ 213, $S_4$ 214, $S_5$ 215, $S_6$ 216 and $S_7$ 217. Discrete transitions between states, in state diagram 200, are limited in number and direction. For example, the encoding process starting at state $S_0$ 210 can only transition back to $S_0$ 210 or forward to $S_1$ 211. Similarly, the process from $S_1$ 211 can only transition to $S_2$ 212 or $S_3$ 213, etc. Each transition between states in state diagram 200 results in the encoding of one bit of information into two bits of error correction coded data. This encoding is further explained with reference to table 290 in FIG. 13.

Table 290 in FIG. 13 has four columns: initial state 291, destination state 292, information 293 and error correction coded data 294. There are a total of sixteen rows in table 290, based on a total of eight states in state diagram 200 and two possible transitions from one specific state to the next immediately-possible states. Table 290 was generated via state diagram 200 and is used herein to illustrate both the encoding of information to produce coded data and the decoding of encoded data to obtain the original information.

In FIG. 12, highlighted encoding path comprising: $S_0$ 210, $S_1$ 211, $S_3$ 213, $S_7$ 217, $S_7$ 217, $S_6$ 216, $S_4$ 214 and $S_0$ 210 is shown for the example encoding of input information 1111000. $S_0$ 210 to $S_1$ 211 encodes 1 into 1. $S_1$ 211 to $S_3$213 encodes 1 into 10. $S_3$ 213 to $S_7$217 encodes 1 into 01. $S_7$ 217 to $S_7$ 217 encodes 1 into 10. $S_7$ 217 to $S_6$ 216 encodes 0 into 01. $S_6$ 216 to $S_4$ 214 encodes 0 in 00. Finally, $S_4$ 214 to $S_0$ 210 encodes 0 into 11. The result of this is that input information (i.e. host information from host(s) 61-65) 1111000 is encoded into error correction coded data 11100110010011 for storage in RAID 90. In trellis diagram 300 of FIG. 7, error correction coded data 11100110010011 is decoded to produce original information 1111000, and that is the highlighted path shown in FIG. 7.

In FIG. 14, encoder circuit 220 is shown for the binary (2,1,3) code of state diagram 200 of FIG. 12 and table 290 of FIG. 13. Encoder circuit 220 may reside in specific circuits 81 of controller 80. Alternatively, encoder 220 may be implemented external to controller 80. Encoder circuit 220 receives input data stream U(J) 221 one bit at a time, for encoding. Encoder circuit 220 comprises an m=3-stage shift register, comprising registers 230, 231, and 232. The initial contents of registers 230-232 are zero for the encoding process, and hence the trellis decoding process, such as illustrated in trellis diagram 300 of FIG. 7 and trellis diagram 500 of FIG. 11, always begins and ends with state $S_0$.

Referring to FIG. 14, the input information stream U(J) 221 and the outputs of registers 230, 231, and 232 are selectively added by n=2 modulo-2 adders (resulting in no carry-over for binary addition), comprising adder 240 to produce output V(J,1) 241 and adder 242 to produce output V(J,2) 243. Multiplexer 251 serializes the individual encoder outputs V(J,1) 241 and V(J,2) 243 into encoded output V 250. The modulo-2 adders may be implemented as XOR (exclusive or) gates in specific circuits 81 or alternatively by use of software, firmware, dedicated logic, etc. Because modulo-2 binary addition is a linear operation, the encoder may operate as a linear feedforward shift register. Each incremental output of V 250 for an index of J, as defined by V(J,1) and V(J,2) in FIG. 14, is referred to as a word. Each branch of trellis diagram 300 in FIG. 7 and trellis diagram 500 of FIG. 11 represents one of these words. Thus, the trellis decoding is done with one branch representing one word, to correspond to the output of the convolution encoder being delivered one word at a time.

FIG. 15 illustrates write command 600 is an example of a SCSI write command, comprising a starting logical block address (LBA) 602, transfer length 603, and Logical Unit Number (LUN) 604. LUN 604 designates to which of spare storage device, such as spare storage 97, that the reconstructed encoded data is written by write command 600. Starting LBA 602 indicates the first logical block address on the spare storage 97 to receive data, and transfer length 603 indicates how much data is transferred. Write command 600 maybe implemented across a SCSI or Fibre Channel interface. Write command 600 is only one possible write command which could be used. Other SCSI write commands include write plus verify, for example, where the written data is verified before the write command successfully concludes.

The embodiments described herein may take the form of an entirely hardware embodiment, an entirely software embodiment or an embodiment containing both hardware and software elements. In certain embodiments, the invention is implemented in software, which includes but is not limited to firmware, resident software, microcode, etc.

Furthermore, embodiments described herein may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk, read only memory (CD-ROM), compact disk, read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The embodiments described herein may be implemented as a method, apparatus or computer program product using standard programming and/or engineering techniques to produce software, firmware, hardware, or any combination thereof.

In certain embodiments, Applicant's invention includes instructions, where those instructions are executed by processor 82 (FIG. 1) and/or controller 80 (FIG. 1) to perform steps recited in the flowcharts shown in FIGS. 6, 8 and 9.

In other embodiments, Applicant's invention includes instructions residing in any other computer program product, where those instructions are executed by a computer external to or internal to, controller 80. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compact flash, smart media, and the like.

Certain embodiments may be directed toward a method for deploying computing infrastructure by a person or by an automated processing system, comprising integrating computer readable code into a system to perform the operations for the described embodiments. For example, FIGS. 6, 8 and 9 illustrate steps for retrieving information in the form of coded data by use of the described embodiments. The code in combination with the system (i.e. SAN 10) is capable of performing the steps for the operation of the embodiments described herein. The deployment of the computing infrastructure may be performed during service, manufacture and/or configuration of the embodiments described herein. For example, a consulting business may have service responsibility for a number of systems. Such service responsibility may include such tasks as system upgrades, error diagnostic, performance tuning and enhancement, installation of new hardware, installation of new software, configuration with other systems, and the like. As part of this service, or as a separate service, the service personnel may configure the system according to the techniques described herein so as to efficiently enable operation of the embodiments described herein. For example, such a configuration could involve the loading into memory of computer instructions, parameters, constants (i.e. type of convolution encoding, number of bits, n in a word, stripe width, number of storage devices, etc.), interrupt vectors, so that when the code is executed, the system may carry out the techniques described to implement the embodiments described herein.

The foregoing description, for purposes of explanation, used specific nomenclature to provide a thorough understanding of the embodiments described. However, it will be apparent to one skilled in the art that the specific details are not required in order to practice the operation of the embodiments. In other instances, well known circuits and devices are shown in block diagram form in order to avoid unnecessary distraction from the embodiments. Thus, the foregoing descriptions of specific embodiments are presented for purposes of illustration and description. They are not intended to be exhaustive or to limit the operation of the embodiments to the precise forms disclosed. Obviously many modifications and variations are possible in view of the above teachings.

The logic of FIGS. 6, 8 and 9 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 6, 8 and 9 may be implemented in software. This logic may be part of the operating system of a host system or an application program. In yet further implementations, this logic may be maintained in storage areas managed by SAN 10 or in a read only memory or other hardwired type of device. The preferred logic may be implemented in hard disk drives or in programmable and non-programmable gate array logic.

Those skilled in the art of RAID may develop other embodiments equivalent to the embodiments described herein. The terms and expressions which have been employed in the foregoing specification are used herein as terms of description and not of limitation, and there is no intention in the use of such terms and expressions of excluding equivalents of the features shown and described or portions thereof, it being recognized that the scope is defined and limited only by the claims which follow.

What is claimed is:

1. A system, comprising:
a plurality of storage devices;
a trellis decoder coupled to said plurality of storage devices, said decoder adapted to process coded data received from said plurality of storage devices to produce decoded data, said coded data comprising error correction coded data produced by the convolution of present and past bits of information;
where said system is adapted to:
determine if there is a failed storage device;
in response to determining that there is a failed storage device:
allocating storage space for the storage of reconstructed data, said reconstructed data comprising coded data previously stored on said failed storage device;
processing said decoded data to produce said reconstructed data; and
storing said reconstructed data on said allocated storage space.

2. The system of claim 1, where said system is further adapted to:
measure a quantity of errors in said decoded data;
compare said quantity of errors to an error limit for said plurality of storage devices; and
in response to said quantity of errors exceeding said error limit for a storage device, identifying said storage device as said failed storage device.

3. The system of claim 1, where said system is further adapted to:
receive self monitoring analysis and reporting technology information from said plurality of storage devices; and
in response to said self monitoring analysis and reporting technology information indicating a failure for a storage device, identifying said storage device as said failed storage device.

4. The system of claim 1, wherein said coded data comprises one or more words, each said word comprising n bits, where n is greater than zero, each said word produced from a convolution encoder processing a portion of said information and where none of said a plurality of storage devices has two or more consecutive words.

5. The system of claim 1, wherein said coded data comprises one or more words, each said word comprising n bits, where n is greater than zero, each said word produced from a convolution encoder processing a portion of said information and where none of said plurality of storage devices has more than one of said n bits of each said word.

6. The system of claim 1, further comprising:
a metadata controller adapted to process metadata associated with said coded data, said metadata comprising storage location information specifying a storage location for said coded data.

7. The system of claim 1, further comprising:
a metadata controller adapted to process metadata associated with said coded data, said metadata comprising encoder information specifying the type of encoding for said coded data.

8. A storage area network comprising:
a least one host computer;
a plurality of storage devices;
a trellis decoder coupled to said plurality of storage devices, said decoder adapted to process coded data received from said plurality of storage devices to produce decoded data, said coded data comprising error correction coded data produced by the convolution of present and past bits of information;
where said system is adapted to:
determine if there is a failed storage device;
in response to determining that there is a failed storage device:
allocating storage space for the storage of reconstructed data, said reconstructed data comprising coded data previously stored on said failed storage device;
processing said decoded data to produce said reconstructed data; and
storing said reconstructed data on said allocated storage space.

9. The storage area network of claim 8, where said network is further adapted to:
measure a quantity of errors in said decoded data;
compare said quantity of errors to an error limit for each of said plurality of storage devices; and
in response to said quantity of errors exceeding said error limit for a storage device, identifying said storage device as said failed storage device.

10. The storage area network of claim 8, where said system is further adapted to:
receive self monitoring analysis and reporting technology information from said plurality of storage devices; and
in response to said self monitoring analysis and reporting technology information indicating a failure for a storage device, identifying said storage device as said failed storage device.

11. The storage area network of claim 8, wherein said coded data comprises one or more words, each said word comprising n bits, where n is greater than zero, each said word produced from a convolution encoder processing a portion of said information and where none of said a plurality of storage devices has two or more consecutive words.

12. The storage area network of claim 8, wherein said coded data comprises one or more words, each said word comprising n bits, where n is greater than zero, each said word produced from a convolution encoder processing a portion of said information and where none of said plurality of storage devices has more than one of said n bits of each said word.

13. The storage area network of claim 8, wherein said plurality of storage devices are disbursed to separate physical locations.

14. A computer program product encoded in an information storage medium, wherein the computer readable program when executed on a computer causes said computer to:
receive coded data from a plurality of storage devices;
produce decoded data by decoding said coded data using a trellis decoder;
determine if there is a failed storage device;
in response to determining that there is a failed storage device:
allocate storage space for the storage of reconstructed data, said reconstructed data comprising coded data previously stored on said failed storage device;
process said decoded data to produce said reconstructed data; and
store said reconstructed data on said allocated storage space.

15. The computer program product of claim 14, wherein the computer readable program when executed on said computer further causes said computer to:
measure a quantity of errors in said decoded data;
compare said quantity of errors to an error limit for each of said plurality of storage devices; and
in response to said quantity of errors exceeding said error limit for a storage device, identify said storage device as said failed storage device.

16. The computer program product of claim 14, wherein the computer readable program when executed on said computer further causes said computer to:
receive self monitoring analysis and reporting technology information from said plurality of storage devices; and
in response to said self monitoring analysis and reporting technology information indicating a failure for a storage device, identify said storage device as said failed storage device.

17. The computer program product of claim 14, wherein the computer readable program when executed on said computer further causes said computer to:
process metadata associated with said coded data, said metadata comprising encoder information specifying the type of encoding for said coded data.

18. The computer program product of claim 14, wherein the computer readable program when executed on said computer further causes said computer to:
charge a customer a fee for said allocating storage space.

19. The computer program product of claim 14, wherein the computer readable program when executed on said computer further causes said computer to:
charge a customer a fee for said storing said reconstructed data on said allocated storage space.

20. The computer program product of claim 14, wherein said coded data comprises one or more words, each said word comprising n bits, where n is greater than zero, each said word produced from a convolution encoder processing a portion of said information and where none of said plurality of storage devices has two or more consecutive words.

* * * * *